US012446025B2

(12) United States Patent
Huang et al.

(10) Patent No.: US 12,446,025 B2
(45) Date of Patent: Oct. 14, 2025

(54) FEEDBACK MULTIPLEXING FOR UPLINK TRANSMISSION WITH REPETITION SKIPPING

(71) Applicant: QUALCOMM Incorporated, San Diego, CA (US)

(72) Inventors: Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 762 days.

(21) Appl. No.: 17/699,029

(22) Filed: Mar. 18, 2022

(65) Prior Publication Data

US 2022/0338215 A1 Oct. 20, 2022

Related U.S. Application Data

(60) Provisional application No. 63/175,050, filed on Apr. 14, 2021.

(51) Int. Cl.

| | |
|---|---|
| ***H04W 72/12*** | (2023.01) |
| ***H04L 1/08*** | (2006.01) |
| ***H04W 72/04*** | (2023.01) |
| ***H04W 72/0446*** | (2023.01) |
| ***H04W 72/1263*** | (2023.01) |
| ***H04W 72/14*** | (2009.01) |
| ***H04W 72/21*** | (2023.01) |
| ***H04W 72/23*** | (2023.01) |

(52) U.S. Cl.

CPC ........... *H04W 72/1263* (2013.01); *H04L 1/08* (2013.01); *H04W 72/0446* (2013.01); *H04W 72/21* (2023.01); *H04W 72/23* (2023.01)

(58) Field of Classification Search

CPC ......... H04W 72/1263; H04W 72/0446; H04W 72/21; H04W 72/23; H04L 1/08; H04L 2001/0093

See application file for complete search history.

(56) References Cited

U.S. PATENT DOCUMENTS 11,581,978 B2 * 2/2023 Hosseini ........... H04W 72/1268
2021/0014858 A1 * 1/2021 Fakoorian ............. H04L 5/0053
2021/0360685 A1 * 11/2021 Huang ................. H04B 7/0697
2022/0123902 A1 * 4/2022 Panteleev ............. H04L 1/1887
2022/0338215 A1 * 10/2022 Huang .................. H04W 72/21

* cited by examiner

*Primary Examiner* — Abdullahi E Salad
(74) *Attorney, Agent, or Firm* — Holland & Hart LLP

(57) ABSTRACT

Methods, systems, and devices for wireless communications are described. A user equipment (UE) may receive a message scheduling a multi-repetition uplink transmission to a base station. The UE may generate a protocol data unit (PDU) comprising filler data for the multi-repetition uplink transmission based at least in part on a quantity of data in a buffer for transmission to the base station failing to satisfy a threshold. The UE may transmit a repetition of the multi-repetition uplink transmission based at least in part on determining that the repetition overlaps with a feedback message scheduled for transmission to the base station, the repetition comprising the PDU multiplexed with the feedback message. The UE may suppress a transmission of one or more additional repetitions of the multi-repetition uplink transmission that do not overlap with the feedback message based at least in part on the PDU comprising the filler data.

16 Claims, 17 Drawing Sheets

FEEDBACK MULTIPLEXING FOR UPLINK TRANSMISSION WITH REPETITION SKIPPING

CROSS REFERENCE

The present application for patent claims the benefit of U.S. Provisional Patent Application No. 63/175,050 by HUANG et al., entitled "FEEDBACK MULTIPLEXING FOR UPLINK TRANSMISSION WITH REPETITION SKIPPING," filed Apr. 14, 2021, assigned to the assignee hereof, and expressly incorporated by reference herein.

FIELD OF TECHNOLOGY

The following relates to wireless communications, including feedback multiplexing for uplink transmission with repetition skipping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support feedback multiplexing for uplink transmission with repetition skipping. Generally, the described techniques provide solutions to address uplink control indicator (UCI) multiplexing onto an uplink transmission (e.g., physical uplink shared channel (PUSCH)) with repetition when PUSCH skipping is enabled. A first solution may include a user equipment (UE) approach where the UE is able to skip PUSCH repetitions, but still multiplex the UCI (e.g., a feedback message carrying or otherwise indicating hybrid automatic repeat/request-acknowledgement (HARQ-ACK) information) onto at least one PUSCH repetition (e.g., any repetition of the multi-repetition uplink transmission) that overlaps with the HARQ-ACK feedback. For example, the UE may be scheduled for PUSCH with repetition (e.g., a multi-repetition uplink transmission), with uplink transmission skipping enabled. The medium access control (MAC) layer of the UE, which may have an empty buffer indicating that no uplink data is available for transmission, may generate a dummy protocol data unit (PDU) that is conveyed to the physical (PHY) layer. The MAC layer may provide the filler PDU to the PHY layer along with an indication (e.g., a bit) indicating that the MAC PDU includes filler data. The UE may also be scheduled with a downlink transmission associated with the HARQ-ACK feedback message, with the feedback message scheduled such that it overlaps with at least one repetition of the multi-repetition uplink transmission (e.g., any repetition in the PUSCH transmission with repetition). The UE may then transmit the at least one of the PUSCH repetitions with the multiplexed UCI, but skip (e.g., suppress) the other PUSCH repetitions based on the dummy MAC PDU (e.g., based on the MAC PDU including filler data).

A second solution may include a base station approach where the base station (e.g., network device) implements a scheduling constraint regarding the HARQ-ACK scheduling. For example, the base station may have a downlink transmission to schedule for the UE. In this solution, the base station may determine the timing for scheduling the downlink transmission such that the HARQ-ACK portion of the downlink transmission overlaps with at least one of the first N PUSCH repetitions, with N being a positive integer of one, two, or possibly more than two. That is, the scheduling constraint may be such that the HARQ-ACK feedback message associated with the downlink transmission is scheduled to overlap with one of the first PUSCH repetitions in time (e.g., the first repetition in time, the second repetition in time, the third repetition in time, etc.).

A method for wireless communications at a UE is described. The method may include receiving a message scheduling a multi-repetition uplink transmission to a base station, generating a PDU including filler data for the multi-repetition uplink transmission based on a quantity of data in a buffer for transmission to the base station failing to satisfy a threshold, transmitting a first repetition of the multi-repetition uplink transmission based on determining that the first repetition overlaps with a feedback message scheduled for transmission to the base station, the first repetition including the PDU multiplexed with the feedback message, and suppressing a transmission of one or more additional repetitions of the multi-repetition uplink transmission that do not overlap with the feedback message based on the PDU including the filler data.

An apparatus for wireless communications at a UE is described. The apparatus may include a processor, memory coupled with the processor, and instructions stored in the memory. The instructions may be executable by the processor to cause the apparatus to receive a message scheduling a multi-repetition uplink transmission to a base station, generate a PDU including filler data for the multi-repetition uplink transmission based on a quantity of data in a buffer for transmission to the base station failing to satisfy a threshold, transmit a first repetition of the multi-repetition uplink transmission based on determining that the first repetition overlaps with a feedback message scheduled for transmission to the base station, the first repetition including the PDU multiplexed with the feedback message, and suppress a transmission of one or more additional repetitions of the multi-repetition uplink transmission that do not overlap with the feedback message based on the PDU including the filler data.

Another apparatus for wireless communications at a UE is described. The apparatus may include means for receiving a message scheduling a multi-repetition uplink transmission to a base station, means for generating a PDU including filler data for the multi-repetition uplink transmission based on a quantity of data in a buffer for transmission to the base station failing to satisfy a threshold, means for transmitting a first repetition of the multi-repetition uplink transmission based on determining that the first repetition overlaps with a feedback message scheduled for transmission to the base station, the first repetition including the PDU multiplexed with the feedback message, and means for suppressing a transmission of one or more additional repetitions of the multi-repetition uplink transmission that do not overlap with the feedback message based on the PDU including the filler data.

A non-transitory computer-readable medium storing code for wireless communications at a UE is described. The code may include instructions executable by a processor to receive a message scheduling a multi-repetition uplink transmission to a base station, generate a PDU including filler data for the multi-repetition uplink transmission based on a quantity of data in a buffer for transmission to the base station failing to satisfy a threshold, transmit a first repetition of the multi-repetition uplink transmission based on determining that the first repetition overlaps with a feedback message scheduled for transmission to the base station, the first repetition including the PDU multiplexed with the feedback message, and suppress a transmission of one or more additional repetitions of the multi-repetition uplink transmission that do not overlap with the feedback message based on the PDU including the filler data.

Some examples of the method, apparatuses, and non-transitory computer-readable medium described herein may further include operations, features, means, or instructions for providing, by a medium access control layer and to a physical layer of the UE, an indication that the PDU includes the filler data, where the one or more additional repetitions may be suppressed by the physical layer based on the indication.

Some examples of the method, apparatuses, and non-transitory computer-readable medium described herein may further include operations, features, means, or instructions for receiving a grant scheduling a downlink transmission to the UE, where expiration of a processing time associated with the grant occurs after a slot associated with an initial repetition of the multi-repetition uplink transmission, and where the feedback message may be associated with the downlink transmission and determining that the feedback message overlaps with the first repetition based on the grant.

Some examples of the method, apparatuses, and non-transitory computer-readable medium described herein may further include operations, features, means, or instructions for receiving an indication that uplink transmission skipping may be supported for the multi-repetition uplink transmission, where the suppressing may be based on the indication.

A method for wireless communication at a base station is described. The method may include transmitting a message scheduling a UE for a multi-repetition uplink transmission spanning a set of multiple slots, and transmitting a grant scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots.

An apparatus for wireless communication at a base station is described. The apparatus may include a processor, memory coupled with the processor, and instructions stored in the memory. The instructions may be executable by the processor to cause the apparatus to transmit a message scheduling a UE for a multi-repetition uplink transmission spanning a set of multiple slots, and transmit a grant scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots.

Another apparatus for wireless communication at a base station is described. The apparatus may include means for transmitting a message scheduling a UE for a multi-repetition uplink transmission spanning a set of multiple slots, and means for transmitting a grant scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots.

A non-transitory computer-readable medium storing code for wireless communication at a base station is described. The code may include instructions executable by a processor to transmit a message scheduling a UE for a multi-repetition uplink transmission spanning a set of multiple slots, and transmit a grant scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots.

Some examples of the method, apparatuses, and non-transitory computer-readable medium described herein may further include operations, features, means, or instructions for identifying a number of repetitions in the multi-repetition uplink transmission, where the at least one repetition may be identified based on the number of repetitions.

In some examples of the method, apparatuses, and non-transitory computer-readable medium described herein, the at least two slots include a first N number of slots occurring within the set of multiple slots, and N includes a positive integer.

Some examples of the method, apparatuses, and non-transitory computer-readable medium described herein may further include operations, features, means, or instructions for identifying a processing time associated with the UE processing the grant, where a transmission time for the grant may be based on the processing time.

Some examples of the method, apparatuses, and non-transitory computer-readable medium described herein may further include operations, features, means, or instructions for transmitting an indication that repetition skipping may be supported for the multi-repetition uplink transmission.

DETAILED DESCRIPTION

Figure 1:
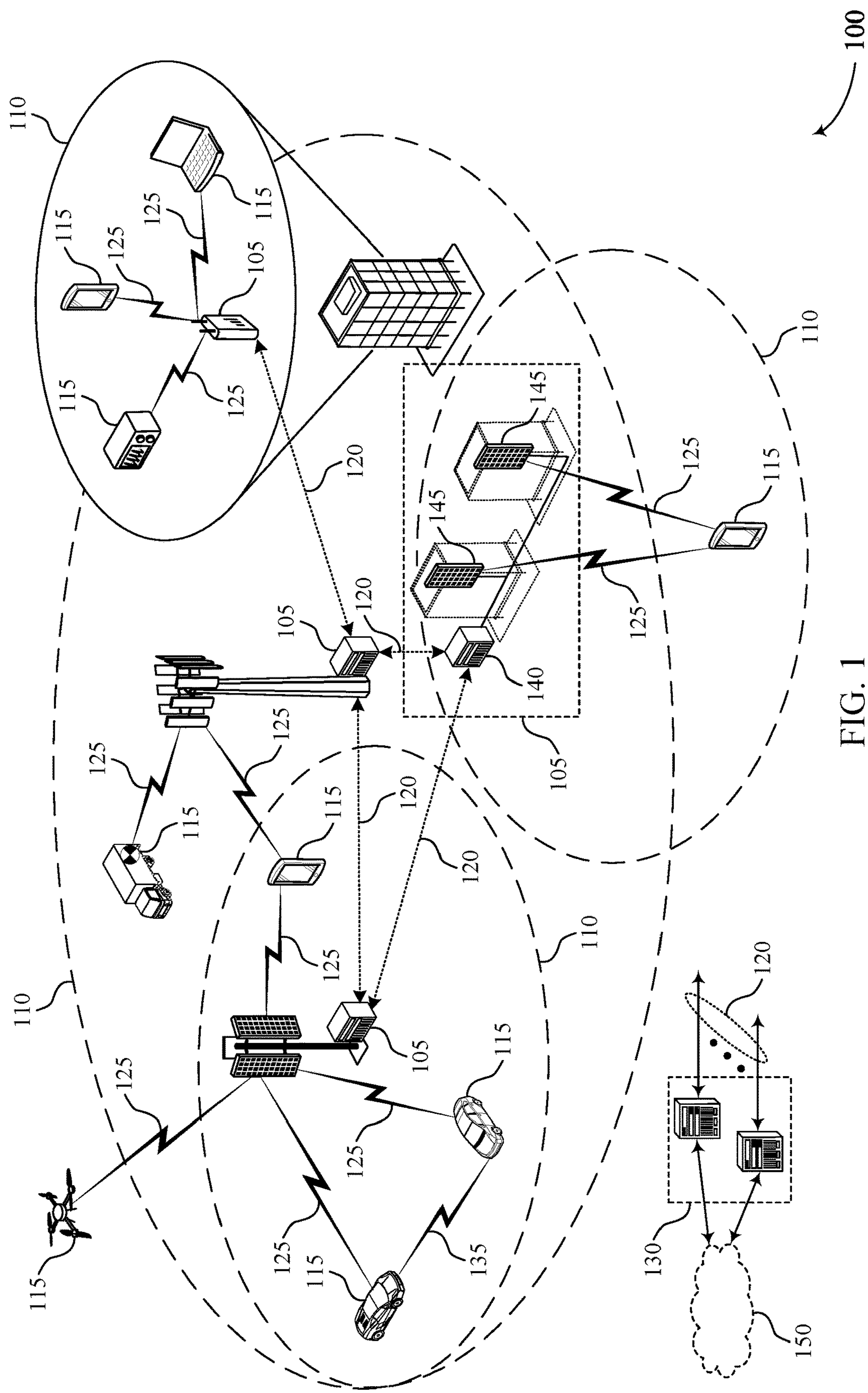
FIG. 1 illustrates an example of a wireless communications system that supports feedback multiplexing for uplink transmission with repetition skipping in accordance with aspects of the present disclosure.

Uplink transmissions (e.g., physical uplink shared channel (PUSCH)) with repetition may be scheduled for a user equipment (UE) to provide uplink information to a base station. The PUSCH with repetition may be dynamically and/or semi-persistently scheduled by the base station. The UE may be enabled for PUSCH skipping in some situations, which permits the UE to decide whether to skip or perform the PUSCH with repetition transmissions. For example, a medium access control (MAC) protocol data unit (PDU) buffer may be empty when the PUSCH with repetition is scheduled, which the UE may use to skip the PUSCH with repetition transmissions. The decision to skip the PUSCH with repetition transmissions is generally a UE decision and the base station may not be aware of what the UE decided without attempting to receive and decode the PUSCH with repetition transmissions. Hybrid automatic repeat/request-acknowledgement (HARQ-ACK) messages may also be multiplexed onto a PUSCH transmission when the HARQ-ACK is scheduled in an overlapping manner with respect to a PUSCH transmission, such as a repetition of a PUSCH transmission with repetitions. When the UE is configured with more than one component carrier (e.g., more than one uplink component carrier), a rule may be applied to determine which uplink carrier the UCI is multiplexed on, which may depend on which uplink carriers have PUSCH transmissions in a slot corresponding to the UCI, and other factors such as carrier index.

In addition, a processing time for the grant scheduling a downlink transmission (e.g., physical downlink shared channel (PDSCH)) associated with the HARQ-ACK may determine a time after receiving the grant that the UE may determine the slot associated with the HARQ-ACK (e.g., which may be based on the slot scheduled for the PDSCH with an offset). The processing time may restrict the timing for receiving the grant relative to PUSCH with repetition transmissions. For example, the UE must receive the grant (e.g., downlink control information (DCI)) in time for the UE to process the DCI, determine when the HARQ-ACK is scheduled with respect to the PUSCH repetitions, and then determine whether to multiplex the UCI onto a PUSCH repetition. This limits the ability for HARQ-ACK multiplexing based on the DCI timing, or may create ambiguity regarding which carrier the HARQ-ACK is carried on (e.g., if the UE skips a PUSCH with repetition transmissions that would otherwise have the HARQ-ACK multiplexed).

Accordingly, aspects of the described techniques provide solutions to address UCI multiplexing onto an uplink transmission (e.g., PUSCH) with repetition when PUSCH skipping is enabled. A first solution may include a UE approach where the UE is able to skip PUSCH repetitions, but still multiplex the UCI (e.g., a feedback message carrying or otherwise indicating HARQ-ACK information) onto at least one PUSCH repetition that overlaps with the HARQ-ACK feedback. For example, the UE may be scheduled for PUSCH with repetition (e.g., a multi-repetition uplink transmission), with uplink transmission skipping enabled. The MAC layer of the UE, which may have an empty buffer indicating that no uplink data is available for transmission, may generate a dummy PDU (e.g., including filler data) that is conveyed to the physical (PHY) layer. The MAC layer may provide the dummy PDU to the PHY layer along with an indication indicating that the MAC PDU includes filler data. In some cases, the indication may be signaled explicitly (e.g., one or more bits sent along with the dummy PDU). Additionally, or alternatively, the indication may be signaled implicitly. For example, the MAC layer may configure the dummy PDU to carry or otherwise convey the indication that the MAC PDU includes filler data. For example, the filler data may include all 0's, all 1's, or some predetermined data value or data pattern. This example may reduce signaling by the MAC layer. The UE may also be scheduled with a downlink transmission associated with the HARQ-ACK feedback message, with the feedback message scheduled such that it overlaps with at least one repetition of the multi-repetition uplink transmission. The UE may then transmit one of the PUSCH repetitions with the multiplexed UCI, but skip (e.g., suppress) the other PUSCH repetitions based on the dummy MAC PDU (e.g., based on the MAC PDU including filler data).

A second solution may include a base station approach where the base station implements a scheduling constraint regarding the HARQ-ACK scheduling. For example, the base station may have a downlink transmission to schedule for the UE. In this solution, the base station may determine the timing for scheduling the downlink transmission such that the HARQ-ACK portion of the downlink transmission overlaps with at least one of the first N PUSCH repetitions, with N being a positive integer of one, two, or maybe three (e.g., one of the first few PUSCH repetitions in time). That is, the scheduling constraint may be such that the HARQ-ACK feedback message associated with the downlink transmission is scheduled to overlap with one of the first PUSCH repetitions in time (e.g., the first repetition in time, the second repetition in time, the third repetition in time, etc.). This example approach may support the UE with an empty uplink buffer multiplexing the UCI (e.g., HARQ-ACK) with the filler data onto an early PUSCH repetition in the N PUSCH repetitions, and skipping or otherwise suppressing the other PUSCH repetitions. This may improve resource efficiency and use within the wireless network.

Aspects of the disclosure are initially described in the context of wireless communications systems. Aspects of the disclosure are further illustrated by and described with reference to apparatus diagrams, system diagrams, and flowcharts that relate to feedback multiplexing for uplink transmission with repetition skipping.

FIG. 1 illustrates an example of a wireless communications system 100 that supports feedback multiplexing for uplink transmission with repetition skipping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a message scheduling a multi-repetition uplink transmission to a base station 105. The UE 115 may generate a PDU comprising filler data for the multi-repetition uplink transmission based at least in part on a quantity of data in a buffer for transmission to the base station 105 failing to satisfy a threshold. The UE 115 may transmit a repetition of the multi-repetition uplink transmission based at least in part on determining that the repetition overlaps with a feedback message scheduled for transmission to the base station, the repetition comprising the PDU multiplexed with the feedback message. The UE 115 may suppress a transmission of one or more additional repetitions of the multi-repetition uplink transmission that do not overlap with the feedback message based at least in part on the PDU comprising the filler data.

A base station 105 may transmit a message scheduling a UE 115 for a multi-repetition uplink transmission spanning a plurality of slots. The base station 105 may transmit a grant scheduling a downlink transmission to the UE 115, wherein the transmitting is based at least in part on an overlap between a feedback message associated with the downlink transmission and at least one repetition of the multi-repetition uplink transmission occurring within a subset of the plurality of slots of the multi-repetition uplink transmission, wherein the subset of the plurality of slots spans at least two slots.

Figure 2A:
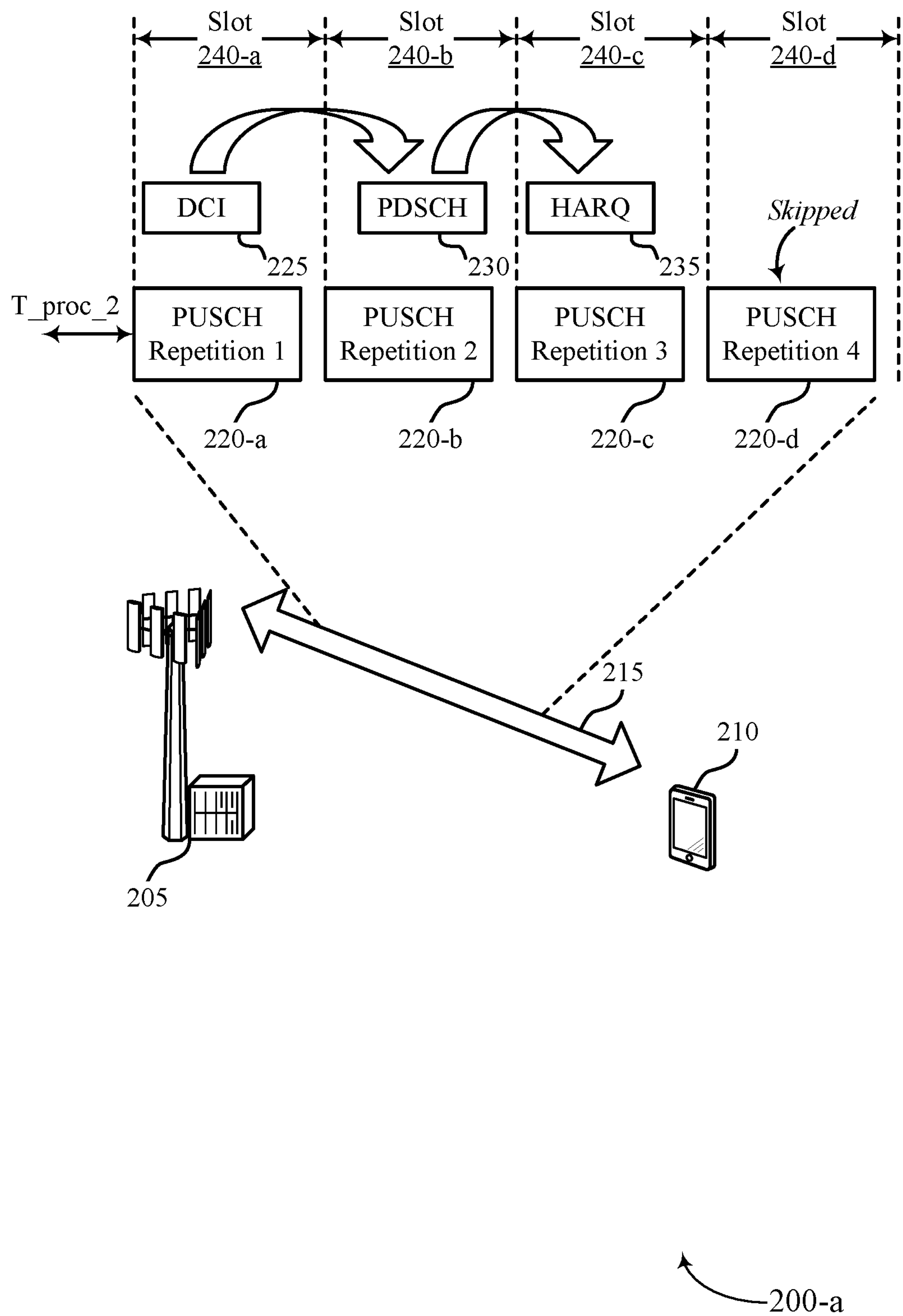
FIGS. 2A and 2B illustrate an example of a wireless communication system that supports feedback multiplexing for uplink transmission with repetition skipping in accordance with aspects of the present disclosure.
Figure 2B:
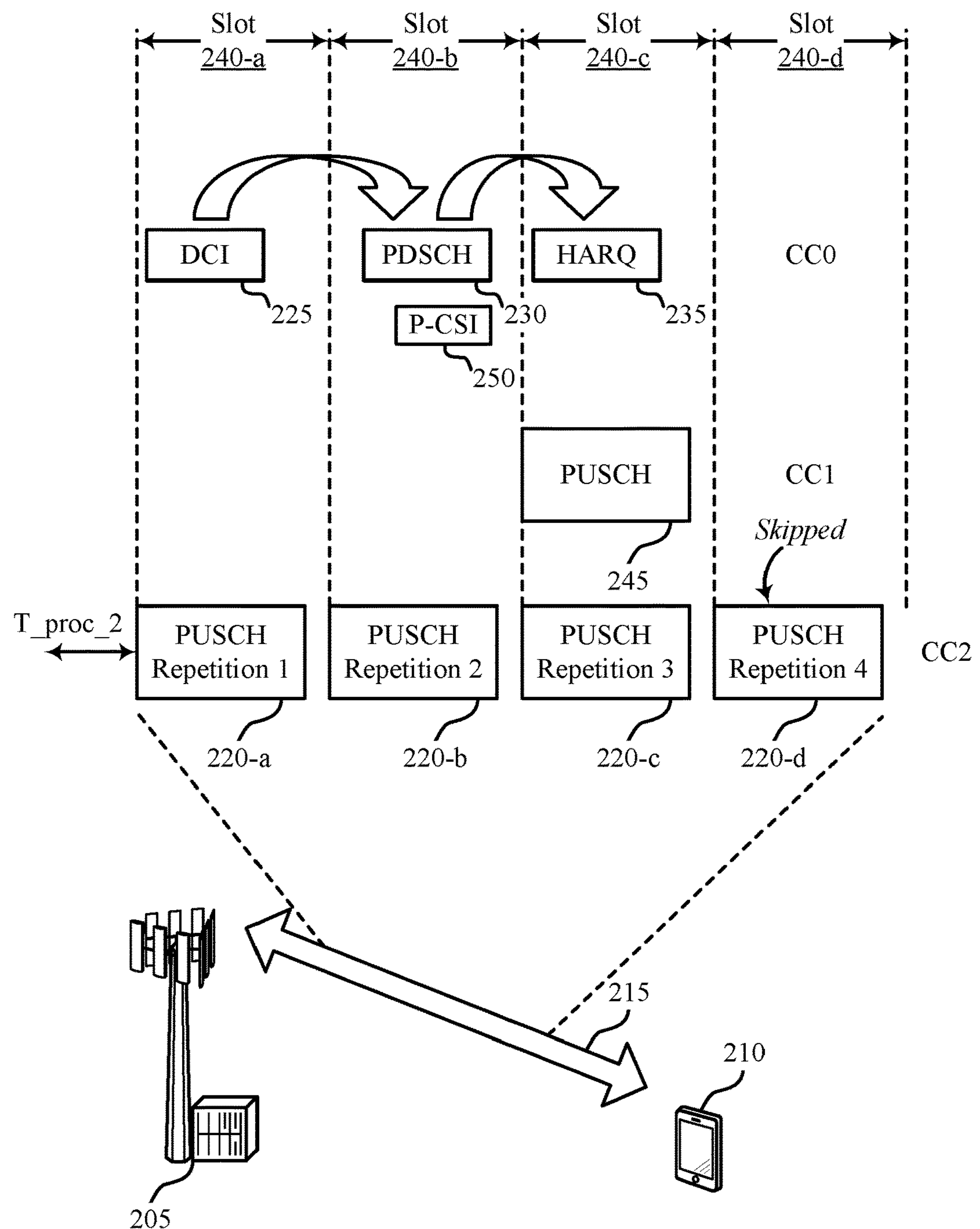

FIGS. 2A and 2B illustrate an example of a wireless communication system 200 that supports feedback multiplexing for uplink transmission with repetition skipping in accordance with aspects of the present disclosure. Wireless communication system 200 may implement aspects of wireless communication system 100. Aspects of wireless communication system 200 may include base station 205 and/or UE 210, which may be examples of the corresponding devices described herein. In some aspects, base station 205 may be a serving base station of UE 210 performing wireless communications via wireless link 215.

In some aspects, base station 205 may schedule UE 210 for an uplink transmission with repetitions (e.g., a multi-repetition uplink transmissions including multiple PUSCH repetitions 220). In the non-limiting example illustrated in FIG. 2, four PUSCH repetitions 220 are shown by way of example only. The multi-repetition uplink transmission (e.g., comprising PUSCH repetitions 220) may be scheduled using a dynamic grant (e.g., using a DCI format 0_0 or 0_1) and/or configured using a configured grant (CG) (e.g., RRC configured CG configurations that are activated using a DCI). Accordingly, base station 205 and UE 210 may have configured resources available for each PUSCH repetition 220 of the multi-repetition uplink transmission.

However, in some situations the MAC layer of UE 210 may have no data to communicate to base station 205. That is, a buffer in the MAC layer may be used to hold uplink data to be communicated, when available. In some instances, the MAC buffer may be empty (e.g., the data may have been previously transmitted, the data may have expired/been canceled, and the like). In this situation, the MAC layer may provide an indication to the PHY layer of UE 210 that the MAC layer has no MAC PDU (e.g., the PDU that would have been generated to hold/carry the uplink data) to generate.

In some aspects, uplink transmission skipping may be enabled or disabled for UE 210 by base station 205 (e.g., using RRC signaling, MAC control element (CE) signaling, and/or DCI signaling). If uplink transmission skipping is enabled, the MAC layer may make the decision to skip the uplink transmission(s) and, when skipped, may send the indication to the PHY layer that there is no MAC PDU to generate. The decision point for the MAC layer to decide whether or not to skip PDU generation is generally a one shot decision taken at the end of the slot before the beginning of a PUSCH transmission. In the situation where the uplink transmission is scheduled with repetition, the MAC layer still makes the single shot decision before the beginning of the first PUSCH repetition 220 (e.g., before/at the beginning of slot 240-*a*). Generally, the MAC layer cannot override or otherwise reverse the decision to skip the PUSCH transmission once made.

However, base station 205 may not know what the UE's decision is regarding PUSCH skipping. Instead, base station 205 may generally attempt to receive and decode the PUSCH transmission/first PUSCH repetition 220-*a*. If PUSCH is received and decoded, then base station 205 may determine that UE 210 did not skip the PUSCH transmission. Conversely, if PUSCH is not received and decoded, then base station 205 may determine that UE 210 did skip the PUSCH transmission.

Base station 205 may also schedule UE 210 for a downlink transmission. For example, DCI 225 may schedule PDSCH 230 and may also identify the resources for HARQ-ACK 235 (e.g., the feedback message associated with the downlink transmission). In the event that HARQ-ACK 235 is scheduled with the downlink transmission, UE 210 may be configured to multiplex the feedback message (e.g., HARQ-ACK 235) onto any PUSCH repetition 220. When PUSCH skipping is not enabled for the uplink transmission, the physical uplink control channel (PUCCH) (e.g., the UCI carrying the HARQ-ACK 235 via the PUCCH) may be multiplexed onto the uplink transmission following certain rules, such as the priority of the CC index, and the like. When PUSCH skipping is enabled for the uplink transmission, base station 205 may not know what CC that the PUCCH is multiplexed onto because base station 205 may not know whether PUSCH is skipped for a CC that might otherwise carry the PUCCH. In the situation where uplink CA is being used, this may mean that base station 205 must perform $2^N$ hypothesis testing to determine which CC that the PUCCH is multiplexed onto, where N corresponds to the number of uplink CCs. This may result in a very large processing burden on base station 205.

One approach to address this may include UE 210 using the UCI multiplexing rule (e.g., the same rule used when PUSCH skipping is not enabled) to identify which PUSCH repetition 220 in which the HARQ-ACK 235 is to be multiplexed onto (e.g., treat the situation as if PUSCH skipping is disabled). In that situation, the MAC layer cannot skip the PUSCH and, instead, generates a dummy PDU for the PUSCH transmission.

While this approach may be helpful in some situations, it may not be helpful when PUSCH with repetition is scheduled. That is, this approach requires that the DCI 225 scheduling the downlink transmission and configuring the resources for HARQ-ACK 235 must be received at least a T_proc_2 time period before the first PUSCH repetition 220 (e.g., before PUSCH repetition 220-*a*). In the non-limiting example illustrated in FIG. 2, this approach would result in HARQ-ACK 235 not being able to be multiplexed onto a PUSCH repetition 220 since DCI 225 is received after T_proc_2. That is, as discussed above the MAC layer typically must make the single decision as to whether or not the PUSCH repetitions 220 will be skipped prior to the first PUSCH repetition 220. With respect to the UCI multiplexing, this means that the DCI 225 must be received a sufficient time prior to PUSCH repetition 220-*a* (e.g., T_proc_2) such that UE 210 can receive and decode DCI 225, identify the HARQ-ACK 235 scheduling, and then multiplex the UCI onto the PUSCH repetition 220. Otherwise, UE 210 may decide to skip the PUSCH repetitions 220 (e.g., the multi-repetition uplink transmission) and therefore cannot multiplex the UCI onto a PUSCH repetition 220.

Turning first to wireless communication system 200-*a* of FIG. 2A, aspects of the described techniques generally remove the downlink DCI 225 scheduling restriction. For example, base station 205 may transmit or otherwise provide a message to UE 210 scheduling the multi-repetition uplink transmission (e.g., PUSCH with repetition) to base station 205. The multi-repetition uplink transmission in this example may include PUSCH repetition 220-*a*, PUSCH repetition 220-*b*, PUSCH repetition 220-*c*, and PUSCH repetition 220-*d*. However, it is to be understood that the multi-repetition uplink transmission may include more or fewer PUSCH repetitions 220. The message scheduling the multi-repetition uplink transmission may include the RRC message identifying CG configurations available for uplink transmissions and the DCI activating a CG configuration and/or a DCI dynamically scheduling the multi-repetition uplink transmission (e.g., semi-persistent and/or dynamically scheduled PUSCH with repetition).

In this situation, UE 210 may generate or otherwise obtain a PDU that includes filler data (e.g., a dummy PDU carrying filler data rather than actual uplink data for transmission) for the multi-repetition uplink transmission. For example, the MAC layer may always generate a PDU that is provided to the PHY layer. If the MAC layer has data in the buffer, the PDU may include the uplink data to be communicated. If the MAC layer has no data in the buffer, the PDU may be a dummy PDU comprised of filler data (e.g., all 1's or 0's). Accordingly, UE 210 (e.g., the MAC layer of UE 210) may determine whether the quantity of data in the buffer for transmission to base station 205 satisfies a threshold (e.g., there is uplink data to be communicated) or fails to satisfy the threshold (e.g., there is no uplink data to be communicated). When the quantity of data in the buffer fails to satisfy the threshold, the MAC layer may generate and provide the dummy PDU containing the filler data to the PHY layer.

In some aspects, the MAC layer may also transmit or otherwise provide an indication to the PHY layer that the PDU carries the filler data. For example, the MAC layer may provide to the PHY layer a bit (e.g., one bit) that, when set to "1" indicates that the MAC PDU includes the filler data or to "0" indicates that the MAC PDU includes uplink data for transmission, or vice versa.

Base station 205 may also schedule UE 210 for the downlink transmission. For example, base station 205 may transmit or otherwise provide to UE 210 DCI 225 via PDCCH during slot 240-*a* that schedules PDSCH 230 during slot 240-*b* and also identifies the resources for HARQ-ACK 235 during slot 240-*c* (e.g., or the resources for HARQ-ACK 235 may have a default offset from PDSCH 230). As illustrated in FIG. 2, DCI 225 is received after T_proc_2 (e.g., the processing time associated with the grant) from the start of PUSCH repetitions 220. Accordingly and prior to PUSCH repetition 220-*a*, UE 210 may have determined that the quantity of data in the buffer fails to satisfy the threshold and therefore the multi-repetition uplink transmission can be skipped or otherwise suppressed. According to the previous approaches addressing this situation, UE 210 would not be able to multiplex HARQ-ACK 235 onto a PUSCH repetition 220 since DCI 225 was received too late.

However, according to aspects of the described techniques UE 210 may receive DCI 225 and determine that HARQ-ACK 235 overlaps with at least one PUSCH repetition 220. For example, UE 210 may determine that the feedback message (e.g., HARQ-ACK 235) associated with the downlink transmission overlaps a PUSCH repetition. In the non-limiting example illustrated in FIG. 2, the HARQ-ACK 235 generally overlaps with PUSCH repetition 220-*c*. In some cases, PUSCH repetition 220-*c* may be called a first repetition. That is, references to the first repetition in this context simply refers to the PUSCH repetition 220 that overlaps with the HARQ-ACK 235 transmission, which could be any of the PUSCH repetitions 220.

That is, according to aspects of the described techniques the MAC and/or PHY layer(s) may independently check each PUSCH repetition 220 to determine if there is an overlapping PUCCH (e.g., HARQ-ACK 235). For example, the MAC and/or PHY layer(s) may know (e.g., based on DCI 225) that there is no HARQ-ACK scheduled for slots 240-*a* and 240-*b* (e.g., no overlapping HARQ-ACK). The MAC and/or PHY layer may determine that HARQ-ACK 235 is scheduled during slot 240-*c* that overlaps with PUSCH repetition 220-*c* (e.g., the third PUSCH repetition 220-*c* in this example, which may be referred to as the first repetition in this context). Accordingly, UE 210 may transmit the repetition (e.g., PUSCH repetition 220-*c*) of the multi-repetition uplink transmission based on the overlap and suppress (e.g., skip) transmission of the other repetitions that do not overlap with a feedback message. In the non-limiting example illustrated in FIG. 2A, this may include UE 210 skipping PUSCH repetition 220-*d* during slot 240-*d*, thus avoiding performing unnecessary uplink transmissions when the uplink buffer of UE 210 is empty or has a small amount of uplink data to be communicated.

That is, each PUSCH repetition 220 may be independently checked to determines if it overlaps with a PUCCH (e.g., HARQ-ACK 235). If there is an overlap with a PUCCH, that PUSCH repetition 220 may be transmitted rather than skipped. If there is no overlap with a PUCCH and the MAC PDU is a dummy PDU including filler data, then that PUSCH repetition 220 can be skipped. If there is no overlap with PUCCH and the MAC PDU is not a dummy PDU (e.g., a real PDU carrying uplink data), then that PUSCH repetition 220 can be transmitted rather than skipped. In some aspects, the PHY layer may independently check each PUSCH repetition 220 based on such factors and make the decision as to whether any particular PUSCH repetition 220 can be skipped or transmitted.

Accordingly, such techniques may remove the downlink DCI scheduling restriction requiring DCI 225 to be received prior to T_proc_2 (e.g., the processing time associated with UE 210 processing DCI 225). This improves UCI multiplexing and improves efficiency overall for wireless communications between base station 205 and UE 210.

Turning next to wireless communication system 200-*b* of FIG. 2B, illustrated therein presents another example of the solution where downlink DCI scheduling restriction may be removed. In this scenario, CC2 has a PUSCH with four repetitions spanning slots 240-*a*, 240-*b*, 240-*c*, and 240-*d*. That is, the multi-repetition uplink transmission comprising four PUSCH repetitions 220 spread across four slots 240. CC1 has a PUSCH 245 scheduled without repetition in slot 240-*c*. Accordingly, both slot 240-*b* and slot 240-*c* both have uplink PUCCH transmissions (e.g., P-CSI 250 in slot 240-*b* and HARQ-ACK 235 in slot 240-*c*).

In this context and consistent with the solutions/approaches discussed above, UE 210 may, for each PUSCH repetition 220 scheduled on CC2, generate a PDU (e.g., PDU 1). In slot 240-*a* and on CC 2, the PUSCH repetition 220-*a* may be dropped/skipped if the PDU 1 is a dummy PDU. Otherwise PUSCH repetition 220-*a* may be transmitted while nothing is transmitted on CC1 (e.g., no uplink is scheduled on CC1 during slot 240-*a*).

In slot 240-*b*, P-CSI 250 may be scheduled for transmission. Because no uplink PUSCH is scheduled for CC1, PUSCH repetition 220-*b* may be multiplexed with P-CSI 250 and transmitted on CC2, regardless of whether the PDU 1 for PUSCH repetition 220-*b* is a dummy PDU (e.g., includes filler data) or a real PDU (e.g., includes uplink data). Nothing is transmitted on CC1 during slot 240-*b*.

During slot 240-*c*, HARQ-ACK 245 is multiplexed on PUSCH repetition 220-*c* on CC1 (e.g., because a UCI multiplexing rule may indicate that the PUSCH 245 scheduled on a smaller CC index has higher priority for UCI multiplexing). In this situation, the MAC layer may generate a PDU 2 (either a real or dummy PDU depending on whether the MAC buffer has data) for PUSCH 245 without repetition scheduled on CC1. The PHY layer of UE 210 may transmit the PDU 2 multiplexed with HARQ-ACK 235 on CC1. UE 210 may skip transmission of PUSCH repetition 220-*c* at slot 240-*c* if the associated PDU is a dummy PDU because no UCI is multiplexed for the PUSCH repetition 220-*c* on CC2 during slot 240-*c*.

The behavior of UE 210 during slot 240-*d* is the same behavior as in slot 240-*a*. For example and in the situation where the uplink buffer of UE 210 is empty, UE 210 may skip PUSCH repetition 220-*d* during slot 240-*d* based on the filler data in the MAC PDU. Accordingly, in this example the P-CSI 250 may be multiplexed onto a PUSCH repetition 220 of a multiple-repetition transmission where some repetitions may be skipped, while the HARQ-ACK 235 may be multiplexed onto an uplink transmission scheduled without repetition (e.g., PUSCH 245) for transmission to base station 205. Thus, the UE 210 may determine repetitions for skipping based on the UCI multiplexing rules and the status of the associated PDU (e.g., a real PDU or a dummy PDU) for each repetition.

Figure 3:
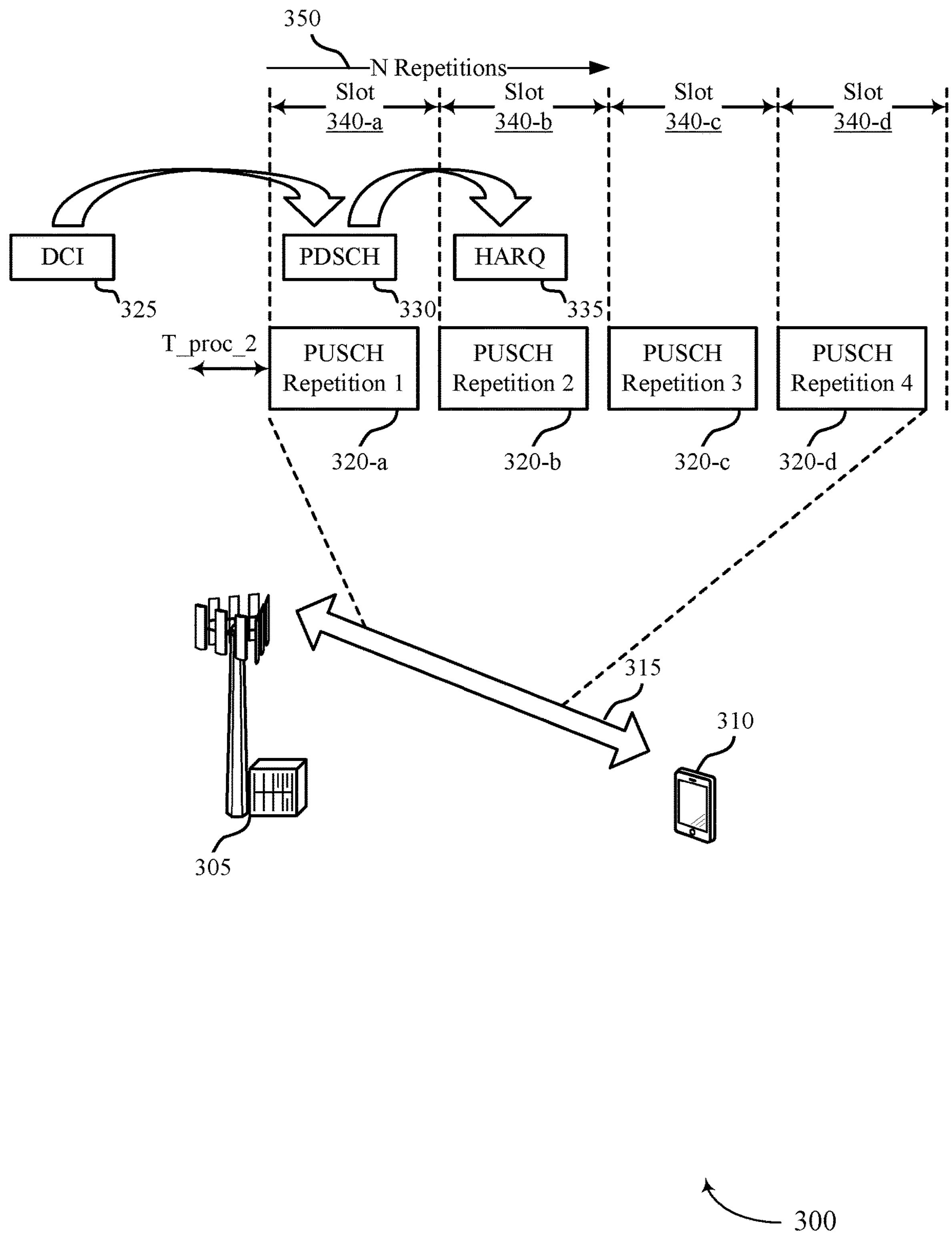
FIG. 3 illustrates an example of a wireless communication system that supports feedback multiplexing for uplink transmission with repetition skipping in accordance with aspects of the present disclosure.

FIG. 3 illustrates an example of a wireless communication system 300 that supports feedback multiplexing for uplink transmission with repetition skipping in accordance with aspects of the present disclosure. Wireless communication system 300 may implement aspects of wireless communication systems 100 and/or 200. Aspects of wireless communication system 300 may include base station 305 and/or UE 310, which may be examples of the corresponding devices described herein. In some aspects, base station 305 may be a serving base station of UE 310 performing wireless communications via wireless link 315.

As discussed above, wireless communications between base station 305 and UE 310 may include a multi-repetition uplink transmission being scheduled for UE 310. For example, base station 305 may schedule UE 310 for an uplink transmission with repetitions (e.g., a multi-repetition uplink transmissions including multiple PUSCH repetitions 320). The multi-repetition uplink transmission may be scheduled for a plurality of slots 340. In the non-limiting example illustrated in FIG. 3, four PUSCH repetitions 320 are shown by way of example only during slots 340-*a*, 340-*b*, 340-*c*, and 340-*d*. The multi-repetition uplink transmission (e.g., comprising PUSCH repetitions 320 scheduled over four slots 340) may be scheduled using a dynamic grant (e.g., using a DCI format 0_0 or 0_1) and/or configured using a CG (e.g., RRC configured CG configurations that are activated using a DCI). Accordingly, base station 305 and UE 310 may have configured resources available for each PUSCH repetition 320 of the multi-repetition uplink transmission during each slot 340.

In some aspects, uplink transmission skipping may be enabled or disabled for UE 310 by base station 305 (e.g., using RRC signaling, MAC CE signaling, and/or DCI signaling). If uplink transmission skipping is enabled, the MAC layer may make the decision to skip the uplink transmission(s) and, when skipped, may send the indication to the PHY layer that there is no MAC PDU to generate. The decision point for the MAC layer to decide whether or not to skip PDU generation is one shot before the beginning of a PUSCH transmission. In the situation where the uplink transmission is scheduled with repetition, the MAC layer still makes the single shot decision before the beginning of the first PUSCH repetition 320 (e.g., before/at the beginning of slot 340-*a*). Generally, the MAC layer cannot override or otherwise reverse the decision to skip the PUSCH transmission once made.

Base station 305 may also schedule UE 310 for a downlink transmission. The downlink transmission may generally include DCI 325 that schedules PDSCH 330 and also identifies the resources for HARQ-ACK 335 (e.g., the feedback message associated with the downlink transmission). However, conventional approaches require that the DCI 325 scheduling the downlink transmission and configuring the resources for HARQ-ACK 335 must be received at least a T_proc_2 time period before the first PUSCH repetition 320 (e.g., before PUSCH repetition 320-*a*). As discussed above, the MAC layer typically must make the single decision as to whether or not the PUSCH repetitions 320 will be skipped prior to the first PUSCH repetition 320. Otherwise, UE 310 may decide to skip the PUSCH repetitions 320 (e.g., the multi-repetition uplink transmission) and therefore cannot multiplex the UCI onto a PUSCH repetition 320. Such approach is inefficient and overly constricting for base station 305 and/or UE 310.

Accordingly, aspects of the described techniques provide a base station-based solution where the downlink DCI scheduling restriction can be removed. Broadly, this solution may enable, when uplink PUSCH skipping in enabled for UE 310, the network (e.g., via base station 305) may guarantee that the UCI is scheduled for multiplexing onto one or the first N PUSCH repetitions 320, where N may be one, two, three (e.g., one of the first few PUSCH repetitions 320 of the multi-repetition uplink transmission). For example, base station 305 may transmit or otherwise provide a message to UE 310 scheduling the multi-repetition uplink transmission that spans the plurality of slots 340.

Base station 305 may also identify or otherwise determine that a downlink transmission is to be scheduled for UE 310. Aspects of the described techniques may provide for a scheduling constraint adopted by base station 305. The scheduling constraint may be such that, for the downlink transmission, base station 305 may schedule the feedback message (e.g., HARQ-ACK 335) during slots 340 such that it overlaps with the first N number of slots 340, wherein N is a positive integer. In some aspects, N may be set to one (e.g., PUSCH repetition 320-*a* during slot 340-*a*), two (e.g., PUSCH repetition 320-*b* during slot 340-*b*), three (e.g., PUSCH repetition 320-*c* during slot 340-*c*), four (e.g., PUSCH repetition 320-*d* during slot 340-*d*), etc. That is, the number N may be set to one of the first number of slots 340 associated with the multi-repetition uplink transmission. Accordingly, base station 305 may determine the timing for scheduling the downlink transmission to UE 310 that ensures the feedback message (e.g., HARQ-ACK 335) of the downlink transmission overlaps with at least one repetition of the multi-repetition uplink transmission that is within N repetitions 350 of the beginning of the multi-repetition uplink transmission. In the non-limiting example illustrated in FIG. 3, the timing comprises base station 305 scheduling the downlink transmission such that HARQ-ACK 335 overlaps with PUSCH repetition 320-*b* during slot 340-*b* (e.g., during a subset of the slots 340). In some cases, the base station 305 may be restricted to scheduling the downlink transmission to UE 310 that ensures the feedback message (e.g., HARQ-ACK 335) of the downlink transmission occurs within N slots 340 of the beginning the multi-repetition uplink transmission.

Accordingly, base station 305 may transmit or otherwise provide to UE 310 the grant (e.g., DCI 325) scheduling the downlink transmission (e.g., PDSCH 330) based on the overlap between the feedback message associated with the downlink transmission (e.g., HARQ-ACK 335) and at least one repetition of the multi-repetition uplink transmission (e.g., PUSCH repetition 320-*b* in this example). Moreover, the timing scheduling the downlink transmission may be based on the overlap occurring within the subset of the plurality of slots 340 that spans at least two slots 340. That is, the HARQ-ACK 335 associated with the downlink transmission may be scheduled during a slot 340 in the subset of slots 340, with the subset of slots 340 spanning the first N slots 340 (which may be two in some examples).

In some aspects, the number of slots 340 in the subset of slots 340 may be based on various factors. One example may include the subset of slots spanning the first two slots 340, the first three slots 340, and the like. In the example where the multi-repetition uplink transmission spans eight or 16 slots 340, the subset of slots 340 may include the first four slots 340. In some examples, the number of slots 340 in the subset of slots 340 may be based on the total number of repetitions in the multi-repetition uplink transmission. For example, the subset of slots 340 (e.g., N) may be 1/10th of the total number of slots 340, may be 1/8th of the total number of slots 340, may be 1/4 of the total number of slots 340, etc. In some examples, the number of slots 340 in the subset of slots 340 may depend on an offset between repetitions in the multi-repetition uplink transmission.

In some examples, the timing for scheduling the downlink transmission may comply with the processing time (e.g., T_proc_2) associated with UE 310 processing the grant (e.g., DCI 325). That is, base station 305 may identify or otherwise determine the processing time associated with UE 310 processing the grant. This may be based on UE capability messages received or otherwise obtained from UE 310, UE assistance information messages received or otherwise obtained from UE 310, and the like. Accordingly, base station 305 may schedule the downlink transmission such that DCI 325 is received prior to a point in time corresponding to T_proc_2 prior to the start of the multi-repetition uplink transmission.

In other examples, the timing for scheduling the downlink transmission may not comply with the processing time (e.g., DCI 325 may be received after the point in time corresponding to T_proc_2 prior to the start of the multi-repetition uplink transmission). In this case, the UE 310 may skip transmission(s) of the multi-repetition uplink transmission (e.g., may skip all transmissions, may skip a subset of transmissions according to the techniques described with respect to FIG. 2A or 2B). Where a transmission is skipped in a same slot as the HARQ-ACK message the base station 305 may perform processing of the HARQ-ACK message based on multiple hypothesis (e.g., 2N hypothesis, where N may be the number of configured uplink CCs, or the number of configured uplink CCs having CC indexes equal or greater than the uplink CC carrying the multi-repetition uplink transmission).

Figure 4:
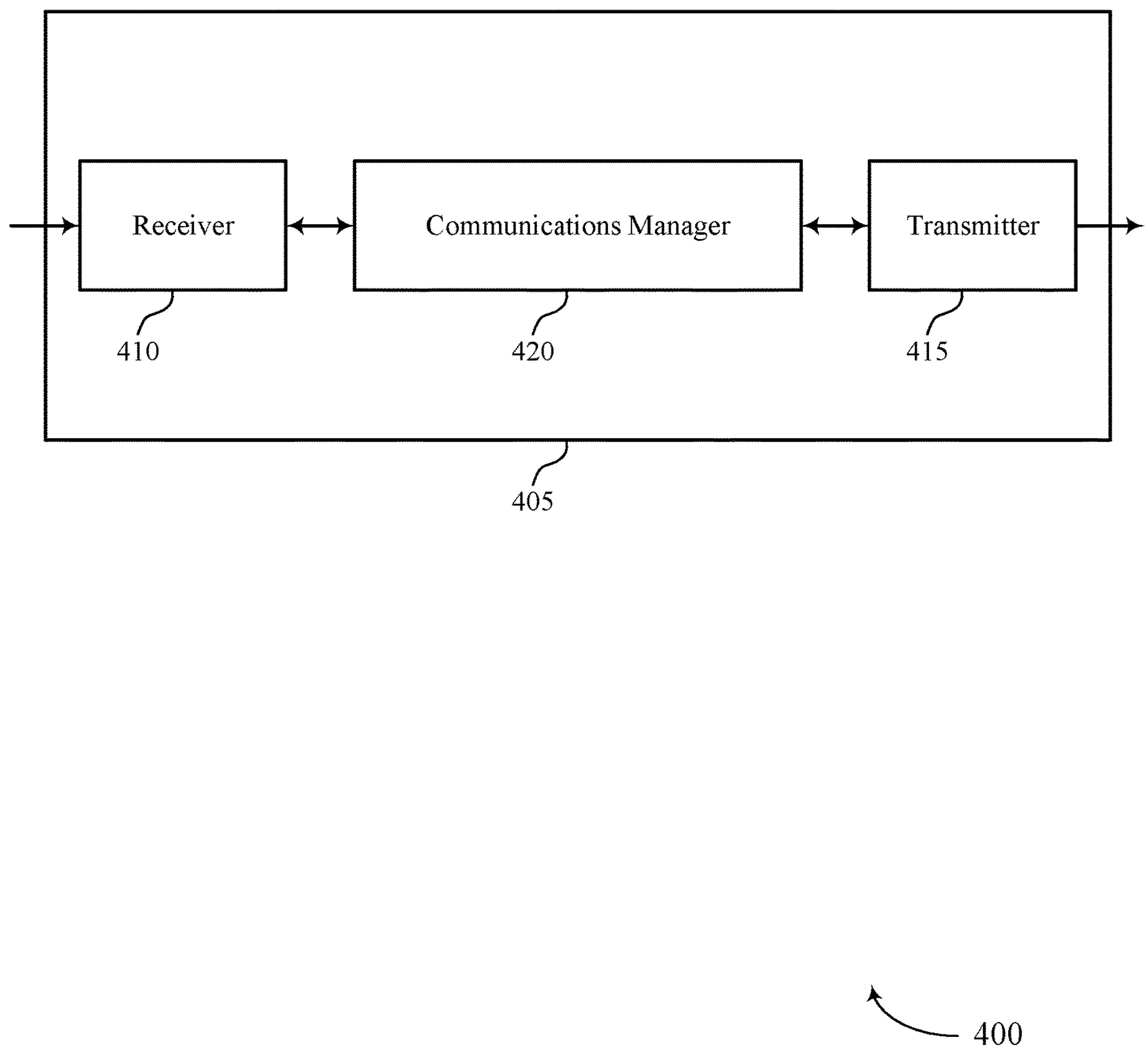
FIGS. 4 and 5 show block diagrams of devices that support feedback multiplexing for uplink transmission with repetition skipping in accordance with aspects of the present disclosure.

FIG. 4 shows a block diagram 400 of a device 405 that supports feedback multiplexing for uplink transmission with repetition skipping in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to feedback multiplexing for uplink transmission with repetition skipping). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to feedback multiplexing for uplink transmission with repetition skipping). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of feedback multiplexing for uplink transmission with repetition skipping as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving a message scheduling a multi-repetition uplink transmission to a base station. The communications manager 420 may be configured as or otherwise support a means for generating a PDU including filler data for the multi-repetition uplink transmission based on a quantity of data in a buffer for transmission to the base station failing to satisfy a threshold. The communications manager 420 may be configured as or otherwise support a means for transmitting a repetition of the multi-repetition uplink transmission based on determining that the repetition overlaps with a feedback message scheduled for transmission to the base station, the repetition including the PDU multiplexed with the feedback message. The communications manager 420 may be configured as or otherwise support a means for suppressing a transmission of one or more additional repetitions of the multi-repetition uplink transmission that do not overlap with the feedback message based on the PDU including the filler data.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improving PUSCH with repetition communications where HARQ-ACK (e.g., UCI carrying a feedback message) for a downlink transmission is multiplexed onto at least one PUSCH repetition.

Figure 5:
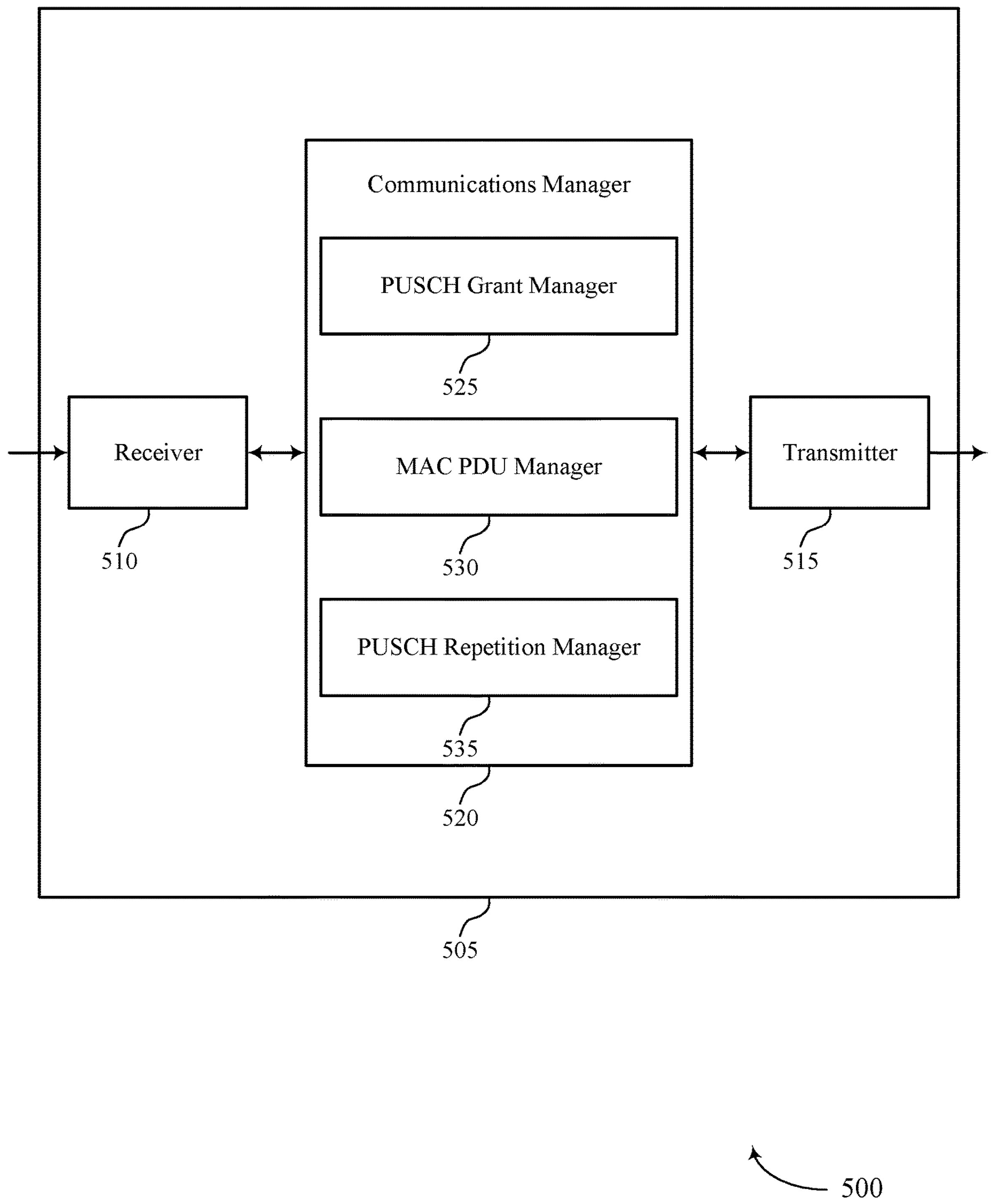

FIG. 5 shows a block diagram 500 of a device 505 that supports feedback multiplexing for uplink transmission with repetition skipping in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback multiplexing for uplink transmission with repetition skipping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback multiplexing for uplink transmission with repetition skipping). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of feedback multiplexing for uplink transmission with repetition skipping as described herein. For example, the communications manager 520 may include an PUSCH grant manager 525, a MAC PDU manager 530, an PUSCH repetition manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The PUSCH grant manager 525 may be configured as or otherwise support a means for receiving a message scheduling a multi-repetition uplink transmission to a base station. The MAC PDU manager 530 may be configured as or otherwise support a means for generating a PDU including filler data for the multi-repetition uplink transmission based on a quantity of data in a buffer for transmission to the base station failing to satisfy a threshold. The PUSCH repetition manager 535 may be configured as or otherwise support a means for transmitting a repetition of the multi-repetition uplink transmission based on determining that the repetition overlaps with a feedback message scheduled for transmission to the base station, the repetition including the PDU multiplexed with the feedback message. The PUSCH repetition manager 535 may be configured as or otherwise support a means for suppressing a transmission of one or more additional repetitions of the multi-repetition uplink transmission that do not overlap with the feedback message based on the PDU including the filler data.

Figure 6:
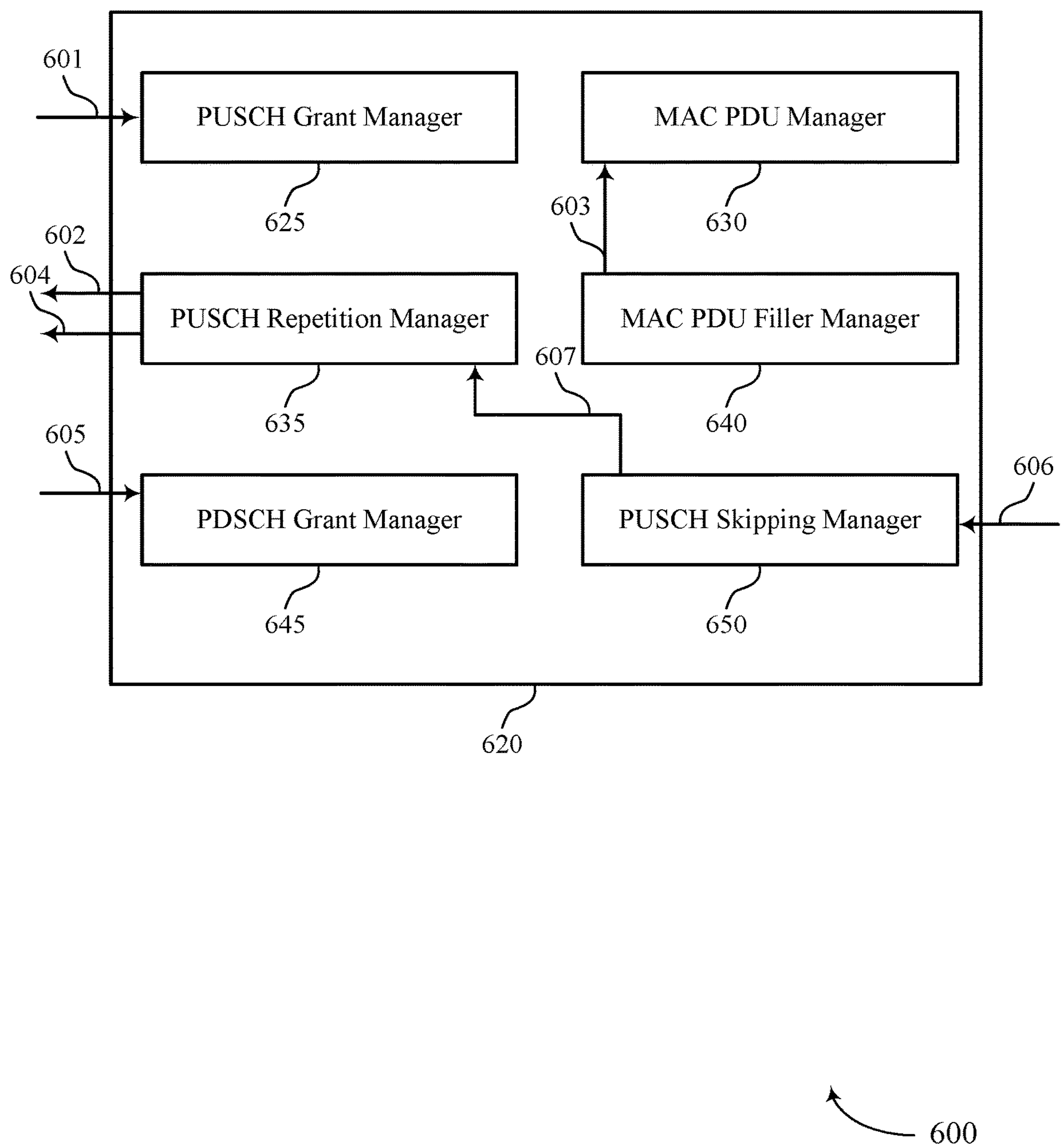
FIG. 6 shows a block diagram of a communications manager that supports feedback multiplexing for uplink transmission with repetition skipping in accordance with aspects of the present disclosure.

FIG. 6 shows a block diagram 600 of a communications manager 620 that supports feedback multiplexing for uplink transmission with repetition skipping in accordance with aspects of the present disclosure. The communications manager 620 may be an example of aspects of a communications manager 420, a communications manager 520, or both, as described herein. The communications manager 620, or various components thereof, may be an example of means for performing various aspects of feedback multiplexing for uplink transmission with repetition skipping as described herein. For example, the communications manager 620 may include an PUSCH grant manager 625, a MAC PDU manager 630, an PUSCH repetition manager 635, a MAC PDU filler manager 640, an PDSCH grant manager 645, an PUSCH skipping manager 650, or any combination thereof. Each of these components may communicate, directly or indirectly, with one another (e.g., via one or more buses).

The communications manager 620 may support wireless communications at a UE in accordance with examples as disclosed herein. The PUSCH grant manager 625 may be configured as or otherwise support a means for receiving a message (e.g., message 601) scheduling a multi-repetition uplink transmission (e.g., multi-repetition uplink transmission 602) to a base station. The MAC PDU manager 630 may be configured as or otherwise support a means for generating a PDU including filler data (e.g., filler data 603) for the multi-repetition uplink transmission based on a quantity of data in a buffer for transmission to the base station failing to satisfy a threshold. The PUSCH repetition manager 635 may be configured as or otherwise support a means for transmitting a repetition (e.g., repetition 604) of the multi-repetition uplink transmission based on determining that the repetition overlaps with a feedback message scheduled for transmission to the base station, the repetition including the PDU multiplexed with the feedback message. In some examples, the PUSCH repetition manager 635 may be configured as or otherwise support a means for suppressing a transmission of one or more additional repetitions of the multi-repetition uplink transmission that do not overlap with the feedback message based on the PDU including the filler data.

In some examples, the MAC PDU filler manager 640 may be configured as or otherwise support a means for providing, by a medium access control layer and to a physical layer of the UE, an indication that the PDU includes the filler data (e.g., filler data 603), where the one or more additional repetitions are suppressed by the physical layer based on the indication.

In some examples, the PDSCH grant manager 645 may be configured as or otherwise support a means for receiving a grant (e.g., grant 605) scheduling a downlink transmission to the UE, where expiration of a processing time associated with the grant occurs after a slot associated with an initial repetition of the multi-repetition uplink transmission, and where the feedback message is associated with the downlink transmission. In some examples, the PDSCH grant manager 645 may be configured as or otherwise support a means for determining that the feedback message overlaps with the repetition based on the grant.

In some examples, the PUSCH skipping manager 650 may be configured as or otherwise support a means for receiving an indication (e.g., indication 606) that uplink transmission skipping is supported for the multi-repetition uplink transmission. The PUSCH skipping manager 650 may provide information 607 to the PUSCH repetition manager 635 to indicate skipping of one or more repetitions, where the suppressing is based on the information 607.

Figure 7:
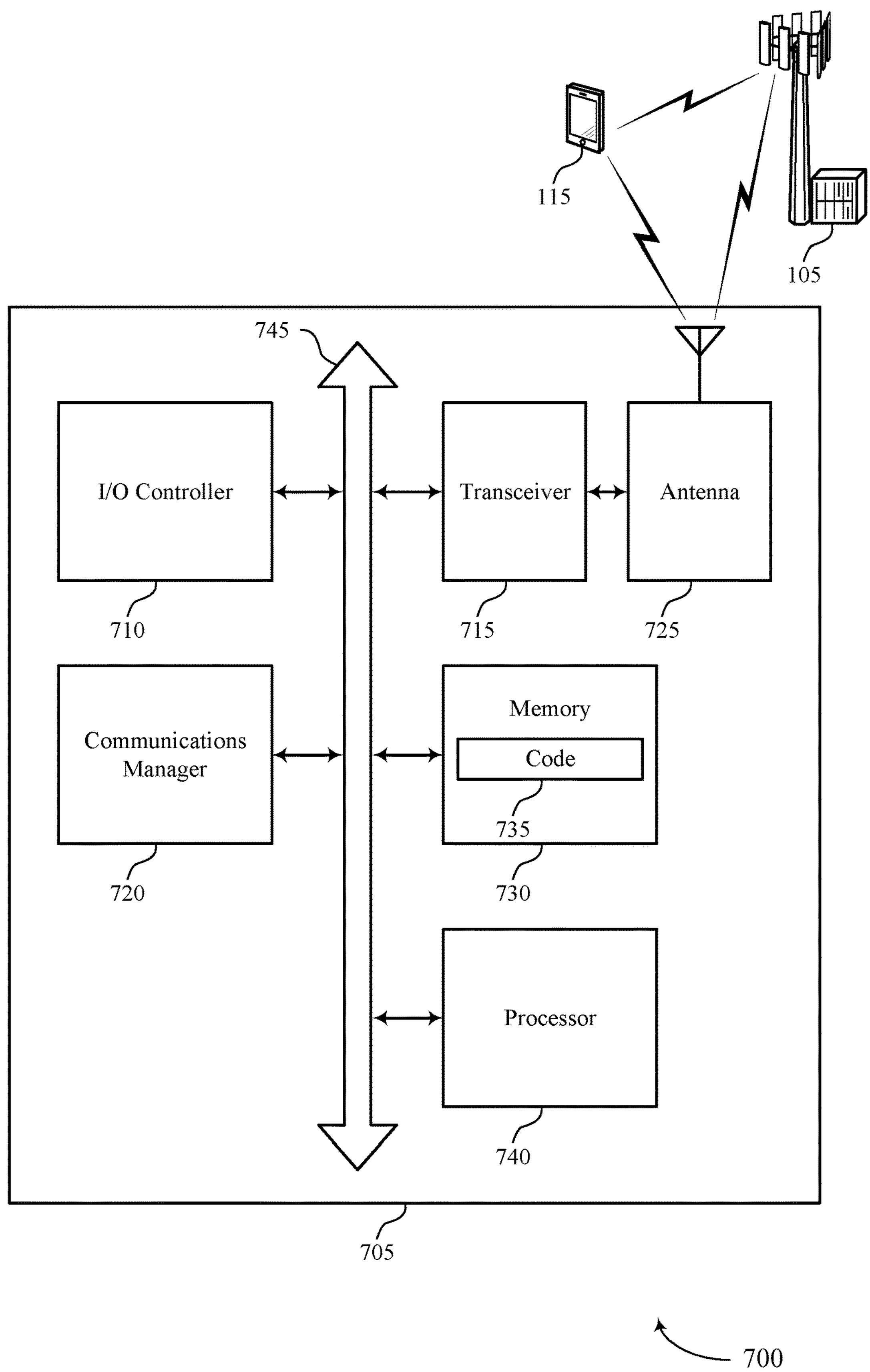
FIG. 7 shows a diagram of a system including a device that supports feedback multiplexing for uplink transmission with repetition skipping in accordance with aspects of the present disclosure.

FIG. 7 shows a diagram of a system 700 including a device 705 that supports feedback multiplexing for uplink transmission with repetition skipping in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting feedback multiplexing for uplink transmission with repetition skipping). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving a message scheduling a multi-repetition uplink transmission to a base station. The communications manager 720 may be configured as or otherwise support a means for generating a PDU including filler data for the multi-repetition uplink transmission based on a quantity of data in a buffer for transmission to the base station failing to satisfy a threshold. The communications manager 720 may be configured as or otherwise support a means for transmitting a repetition of the multi-repetition uplink transmission based on determining that the repetition overlaps with a feedback message scheduled for transmission to the base station, the repetition including the PDU multiplexed with the feedback message. The communications manager 720 may be configured as or otherwise support a means for suppressing a transmission of one or more additional repetitions of the multi-repetition uplink transmission that do not overlap with the feedback message based on the PDU including the filler data.

By including or configuring the communications manager 720 in accordance with examples as described herein, the device 705 may support techniques for improving PUSCH with repetition communications where HARQ-ACK (e.g., UCI carrying a feedback message) for a downlink transmission is multiplexed onto at least one PUSCH repetition.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of feedback multiplexing for uplink transmission with repetition skipping as described herein, or the processor 740 and the memory 730 may be otherwise configured to perform or support such operations.

Figure 8:
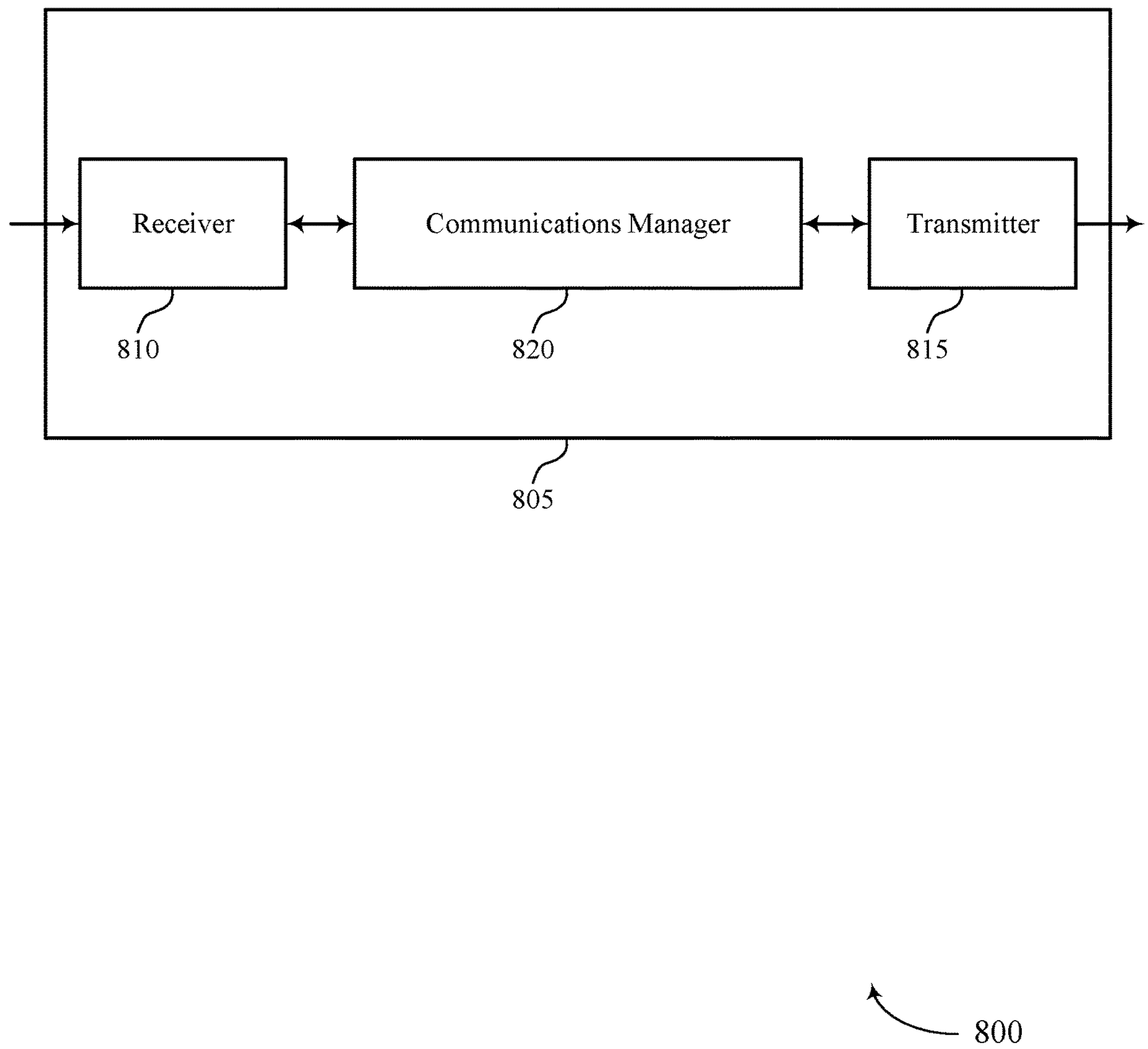
FIGS. 8 and 9 show block diagrams of devices that support feedback multiplexing for uplink transmission with repetition skipping in accordance with aspects of the present disclosure.

FIG. 8 shows a block diagram 800 of a device 805 that supports feedback multiplexing for uplink transmission with repetition skipping in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to feedback multiplexing for uplink transmission with repetition skipping). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to feedback multiplexing for uplink transmission with repetition skipping). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of feedback multiplexing for uplink transmission with repetition skipping as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting a message scheduling a UE for a multi-repetition uplink transmission spanning a set of multiple slots. The communications manager 820 may be configured as or otherwise support a means for transmitting a grant scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improving PUSCH with repetition communications where HARQ-ACK (e.g., UCI carrying a feedback message) for a downlink transmission is multiplexed onto at least one PUSCH repetition.

Figure 9:
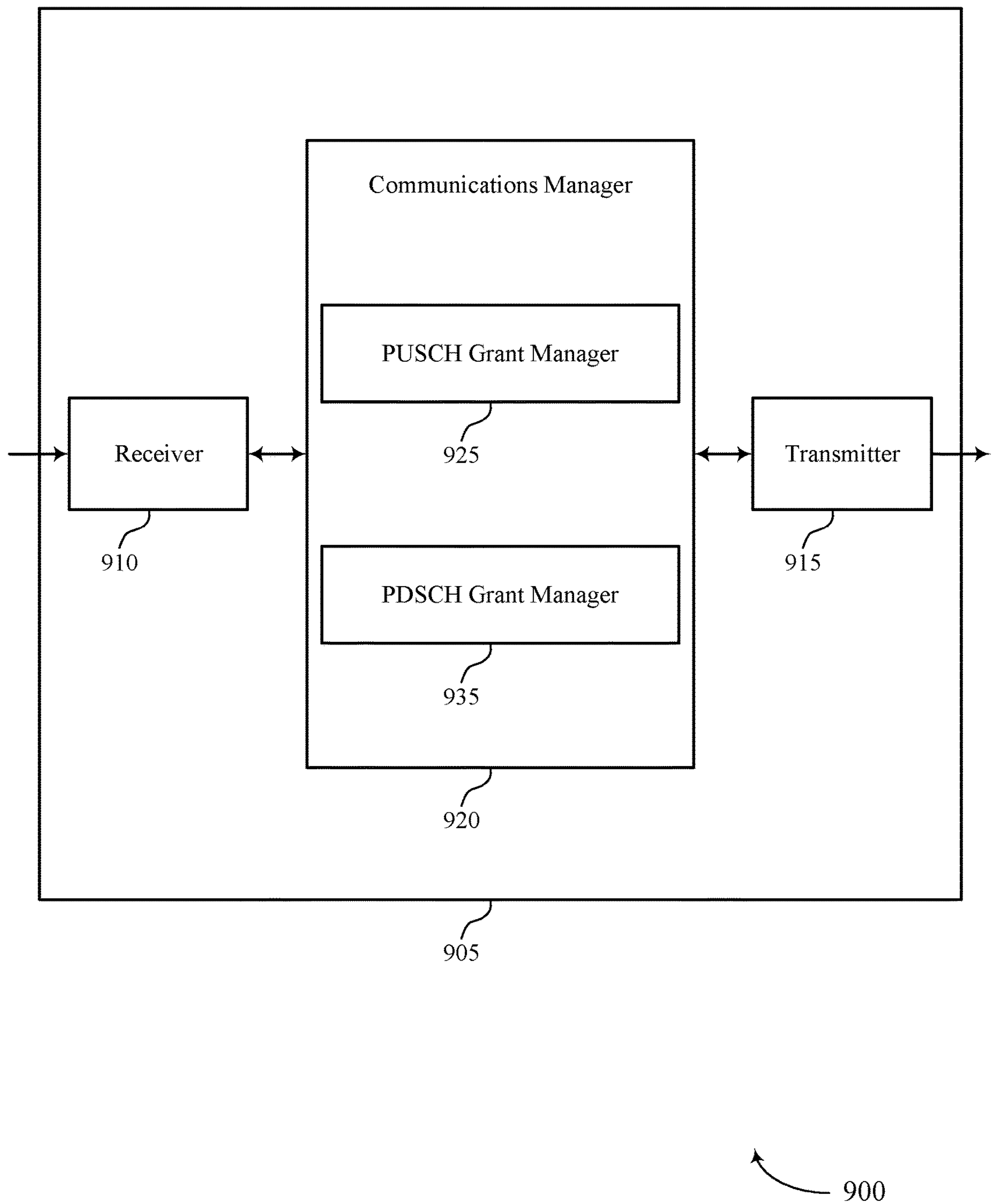

FIG. 9 shows a block diagram 900 of a device 905 that supports feedback multiplexing for uplink transmission with repetition skipping in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback multiplexing for uplink transmission with repetition skipping). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback multiplexing for uplink transmission with repetition skipping). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of feedback multiplexing for uplink transmission with repetition skipping as described herein. For example, the communications manager 920 may include an PUSCH grant manager 925, an PDSCH grant manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The PUSCH grant manager 925 may be configured as or otherwise support a means for transmitting a message scheduling a UE for a multi-repetition uplink transmission spanning a set of multiple slots. The PDSCH grant manager 935 may be configured as or otherwise support a means for transmitting a grant scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots.

Figure 10:
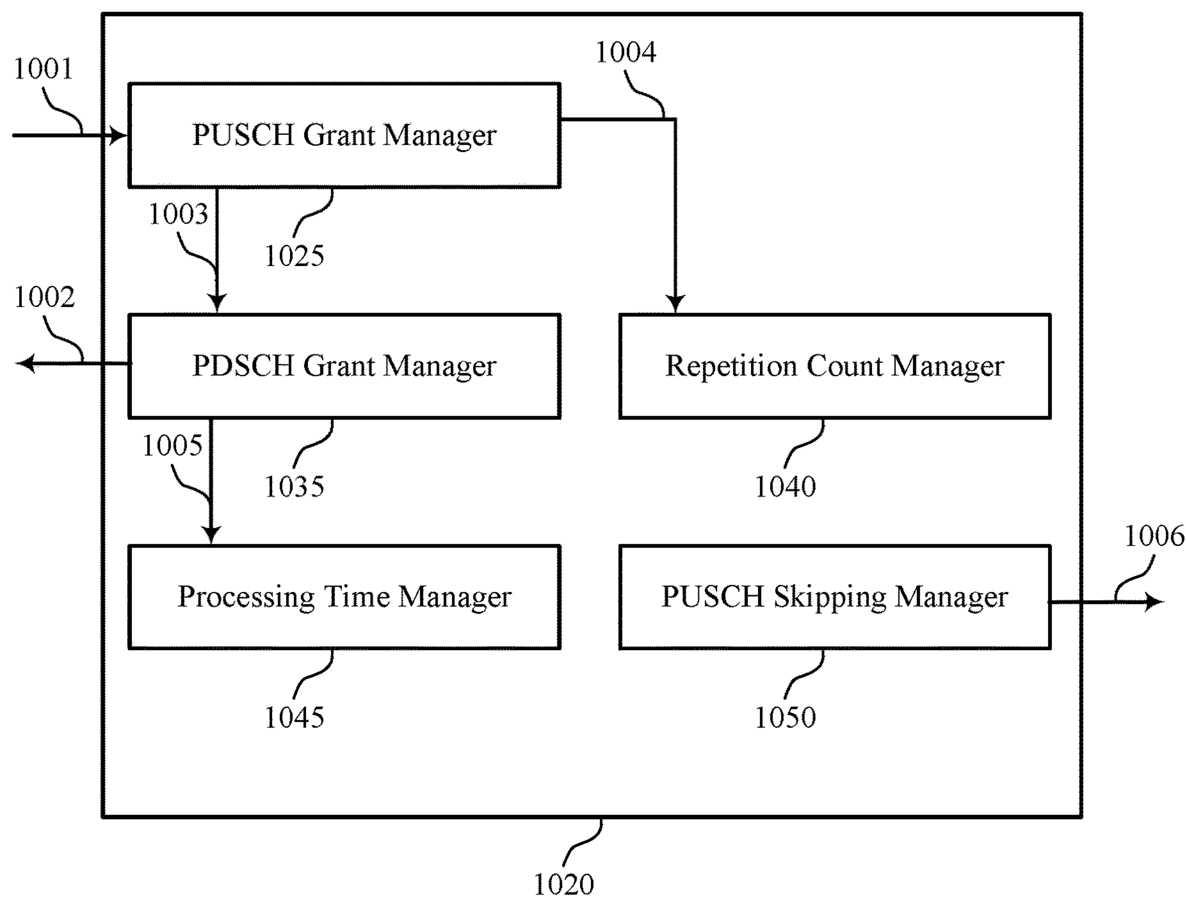
FIG. 10 shows a block diagram of a communications manager that supports feedback multiplexing for uplink transmission with repetition skipping in accordance with aspects of the present disclosure.

FIG. 10 shows a block diagram 1000 of a communications manager 1020 that supports feedback multiplexing for uplink transmission with repetition skipping in accordance with aspects of the present disclosure. The communications manager 1020 may be an example of aspects of a communications manager 820, a communications manager 920, or both, as described herein. The communications manager 1020, or various components thereof, may be an example of means for performing various aspects of feedback multiplexing for uplink transmission with repetition skipping as described herein. For example, the communications manager 1020 may include an PUSCH grant manager 1025, an PDSCH grant manager 1035, a repetition count manager 1040, a processing time manager 1045, an PUSCH skipping manager 1050, or any combination thereof. Each of these components may communicate, directly or indirectly, with one another (e.g., via one or more buses).

The communications manager 1020 may support wireless communication at a base station in accordance with examples as disclosed herein. The PUSCH grant manager 1025 may be configured as or otherwise support a means for transmitting a message (e.g., message 1001) scheduling a UE for a multi-repetition uplink transmission spanning a set of multiple slots. The PDSCH grant manager 1035 may be configured as or otherwise support a means for transmitting a grant (e.g., grant 1002) scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots. For example, the PUSCH grant manager 1025 may provide information 1003 to the PDSCH grant manager 1035 indicating timing for the multi-repetition uplink transmission and the PDSCH grant manager 1035 may determine the overlap based on the information 1003 and the downlink transmission timing.

In some examples, the repetition count manager 1040 may be configured as or otherwise support a means for identifying a number of repetitions in the multi-repetition uplink transmission, where the at least one repetition is identified based on the number of repetitions. In some examples, the at least two slots include a first N number of slots occurring within the set of multiple slots. In some examples, N includes a positive integer. For example, the repetition count manager 1040 may receive an indication 1004 of the repetitions in the multi-repetition uplink transmission from the PUSCH grant manager 1025.

In some examples, the processing time manager 1045 may be configured as or otherwise support a means for identifying a processing time associated with the UE processing the grant (e.g., processing time 1005), where a transmission time for the grant is based on the processing time.

In some examples, the PUSCH skipping manager 1050 may be configured as or otherwise support a means for transmitting an indication (e.g., indication 1006) that repetition skipping is supported for the multi-repetition uplink transmission.

Figure 11:
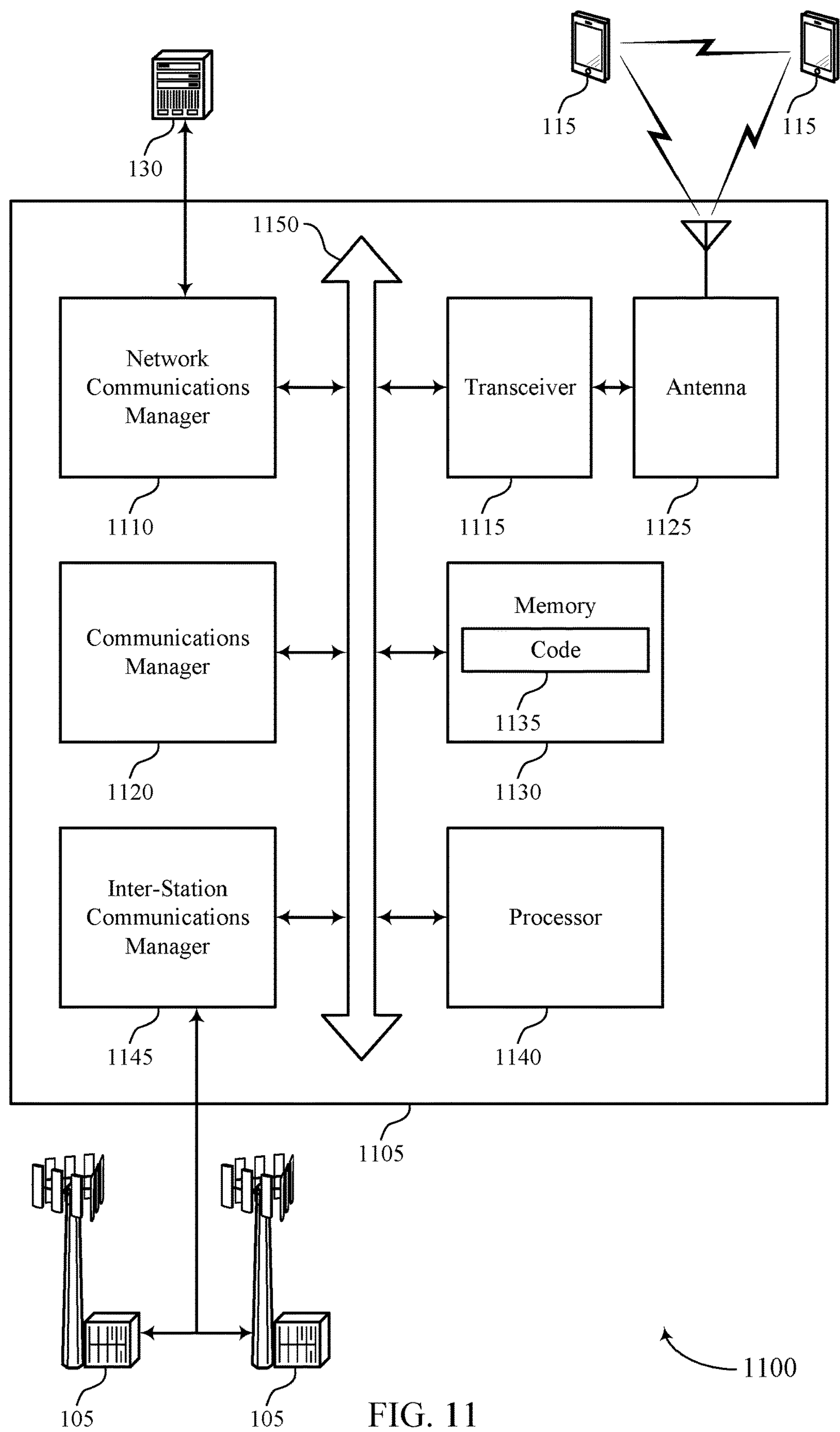
FIG. 11 shows a diagram of a system including a device that supports feedback multiplexing for uplink transmission with repetition skipping in accordance with aspects of the present disclosure.

FIG. 11 shows a diagram of a system 1100 including a device 1105 that supports feedback multiplexing for uplink transmission with repetition skipping in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting feedback multiplexing for uplink transmission with repetition skipping). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting a message scheduling a UE for a multi-repetition uplink transmission spanning a set of multiple slots. The communications manager 1120 may be configured as or otherwise support a means for transmitting a grant scheduling a downlink transmission to the UE, wherein the transmitting is based on an overlap between a feedback message associated with the downlink transmission and at least one repetition of the multi-repetition uplink transmission occurring within a subset of the set of multiple slots of the multi-repetition uplink transmission, where the subset of the set of multiple slots spans at least two slots.

By including or configuring the communications manager 1120 in accordance with examples as described herein, the device 1105 may support techniques for improving PUSCH with repetition communications where HARQ-ACK (e.g., UCI carrying a feedback message) for a downlink transmission is multiplexed onto at least one PUSCH repetition.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of feedback multiplexing for uplink transmission with repetition skipping as described herein, or the processor 1140 and the memory 1130 may be otherwise configured to perform or support such operations.

Figure 12:
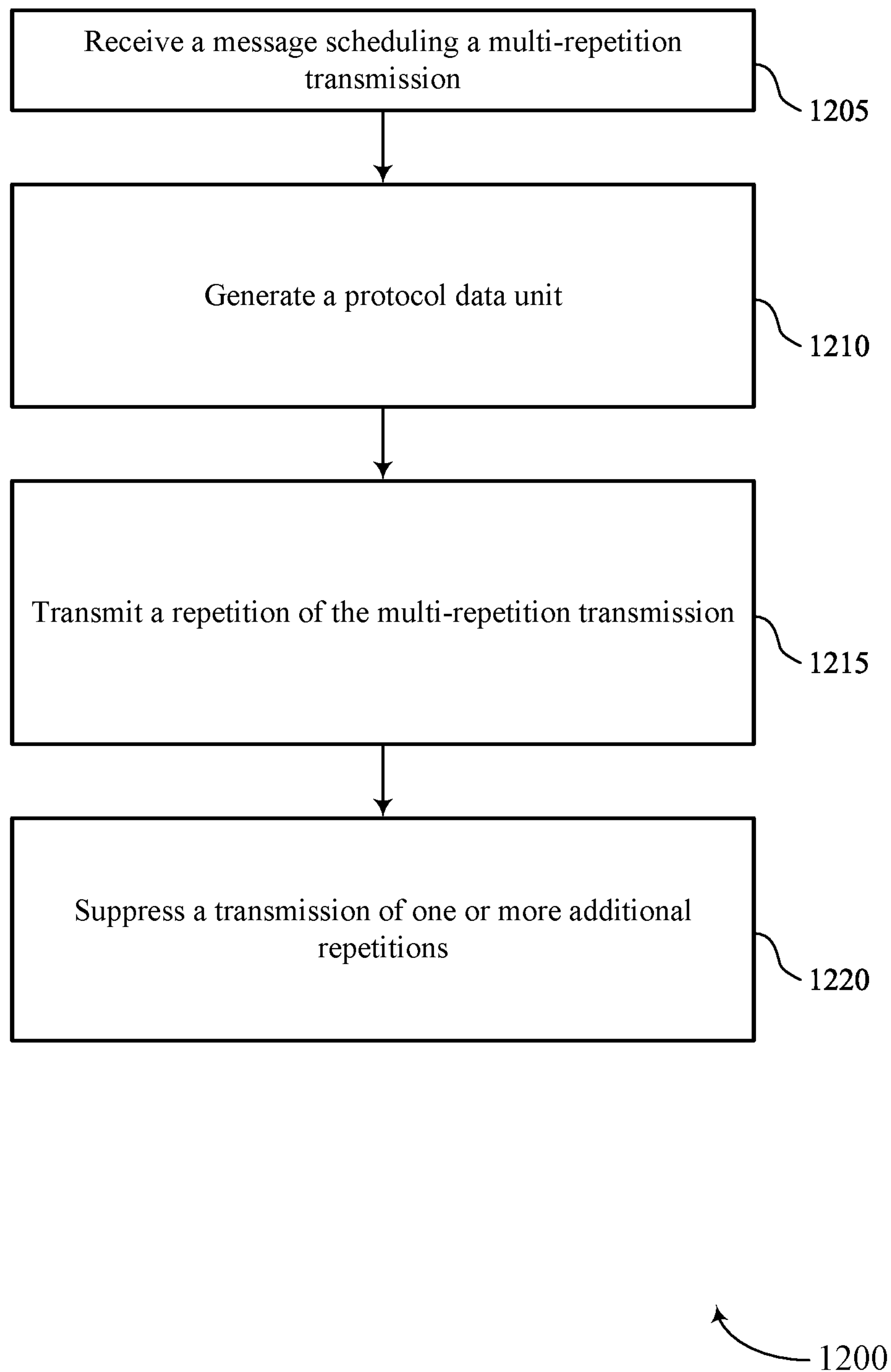
FIGS. 12 through 16 show flowcharts illustrating methods that support feedback multiplexing for uplink transmission with repetition skipping in accordance with aspects of the present disclosure.

FIG. 12 shows a flowchart illustrating a method 1200 that supports feedback multiplexing for uplink transmission with repetition skipping in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving a message scheduling a multi-repetition transmission. In some aspects, the multi-repetition transmission may be an uplink transmission over a Uu cellular interface (e.g., directed to a base station), a sidelink transmission over a PC5 interface (e.g., directed to another UE), and the like. In some aspects, the multi-repetition transmission may be a transmission of data (e.g., PUSCH/physical sidelink shared channel (PSSCH)) and/or control information (e.g., PUCCH/physical sidelink control channel (PSCCH)). In some aspects, the multi-repetition transmission may be carried via one or more CC(s). The operations of 1205 may be performed in accordance with examples as disclosed herein. In some examples, aspects of the operations of 1205 may be performed by an PUSCH grant manager 625 as described with reference to FIG. 6.

At 1210, the method may include generating a PDU. In some aspects, the PDU may include filler data (e.g., a specific bit sequence, a single bit/field set to a (pre)configured value, and the like), which may carry or otherwise provide an indication that the PDU is a dummy PDU. In some aspects, the PDU may be for the multi-repetition transmission. For example, the filler data may be based on a quantity of data in a buffer (e.g., whether the UE has data to be carried or otherwise conveyed in the multi-repetition transmission. As discussed, the multi-repetition transmission may be for transmission to the base station. In some aspects, the filler data may be included in the PDU based on the data in the buffer failing to satisfy a threshold. For example, having no or little data (e.g., one, two, three, or some other relatively small number of bits) in the buffer may indicate that the buffer is empty, which may fail to satisfy the threshold. The operations of 1210 may be performed in accordance with examples as disclosed herein. In some examples, aspects of the operations of 1210 may be performed by a MAC PDU manager 630 as described with reference to FIG. 6.

At 1215, the method may include transmitting a repetition of the multi-repetition transmission. In some aspects, the base station may perform the multi-repetition transmission based on a determination that the repetition overlaps with a feedback message. For example, the UE may have feedback information (e.g., HARQ-ACK information) scheduled for transmission to the base station, which may overlap with the repetition. Accordingly, the repetition including the PDU may be multiplexed with the feedback message. The operations of 1215 may be performed in accordance with examples as disclosed herein. In some examples, aspects of the operations of 1215 may be performed by an PUSCH repetition manager 635 as described with reference to FIG. 6.

At 1220, the method may include suppressing a transmission of one or more additional repetitions. In some aspects, the UE may suppress the transmission of the additional repetition(s) of the multi-repetition transmission because they do not overlap with the feedback message. That is, the UE may identify or otherwise determine that the additional repetition(s) of the multi-repetition transmission do not overlap in the time domain with the feedback message. Based on the PDU including the filler data (e.g., the buffer having less than the threshold bits), the UE may skip the remaining additional repetition(s) since the filler data provides an indication that the UE has no data for transmission, and has therefore skipped (e.g., suppressed) the remaining repetition(s). This may enable the base station to skip monitoring for those repetition(s), thus conserving resources and improving efficiency. The operations of 1220 may be performed in accordance with examples as disclosed herein. In some examples, aspects of the operations of 1220 may be performed by an PUSCH repetition manager 635 as described with reference to FIG. 6.

Figure 13:
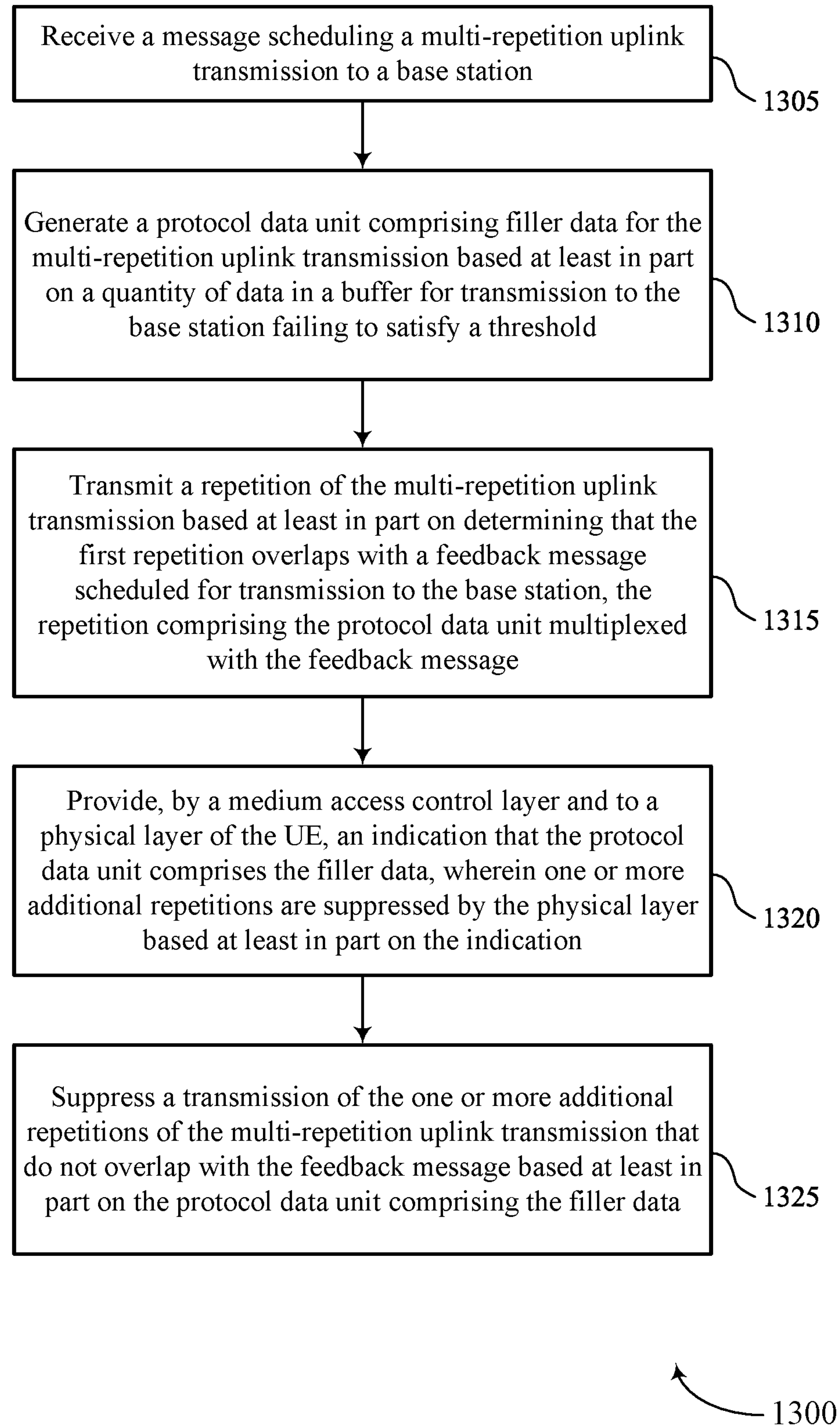

FIG. 13 shows a flowchart illustrating a method 1300 that supports feedback multiplexing for uplink transmission with repetition skipping in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving a message scheduling a multi-repetition uplink transmission to a base station. The operations of 1305 may be performed in accordance with examples as disclosed herein. In some examples, aspects of the operations of 1305 may be performed by an PUSCH grant manager 625 as described with reference to FIG. 6.

At 1310, the method may include generating a PDU including filler data for the multi-repetition uplink transmission based on a quantity of data in a buffer for transmission to the base station failing to satisfy a threshold. The operations of 1310 may be performed in accordance with examples as disclosed herein. In some examples, aspects of the operations of 1310 may be performed by a MAC PDU manager 630 as described with reference to FIG. 6.

At 1315, the method may include transmitting a repetition of the multi-repetition uplink transmission based on determining that the repetition overlaps with a feedback message scheduled for transmission to the base station, the repetition including the PDU multiplexed with the feedback message. The operations of 1315 may be performed in accordance with examples as disclosed herein. In some examples, aspects of the operations of 1315 may be performed by an PUSCH repetition manager 635 as described with reference to FIG. 6.

At 1320, the method may include providing, by a medium access control layer and to a physical layer of the UE, an indication that the PDU includes the filler data, where the one or more additional repetitions are suppressed by the physical layer based on the indication. The operations of 1320 may be performed in accordance with examples as disclosed herein. In some examples, aspects of the operations of 1320 may be performed by a MAC PDU filler manager 640 as described with reference to FIG. 6.

At 1325, the method may include suppressing a transmission of one or more additional repetitions of the multi-repetition uplink transmission that do not overlap with the feedback message based on the PDU including the filler data. The operations of 1325 may be performed in accordance with examples as disclosed herein. In some examples, aspects of the operations of 1325 may be performed by an PUSCH repetition manager 635 as described with reference to FIG. 6.

Figure 14:
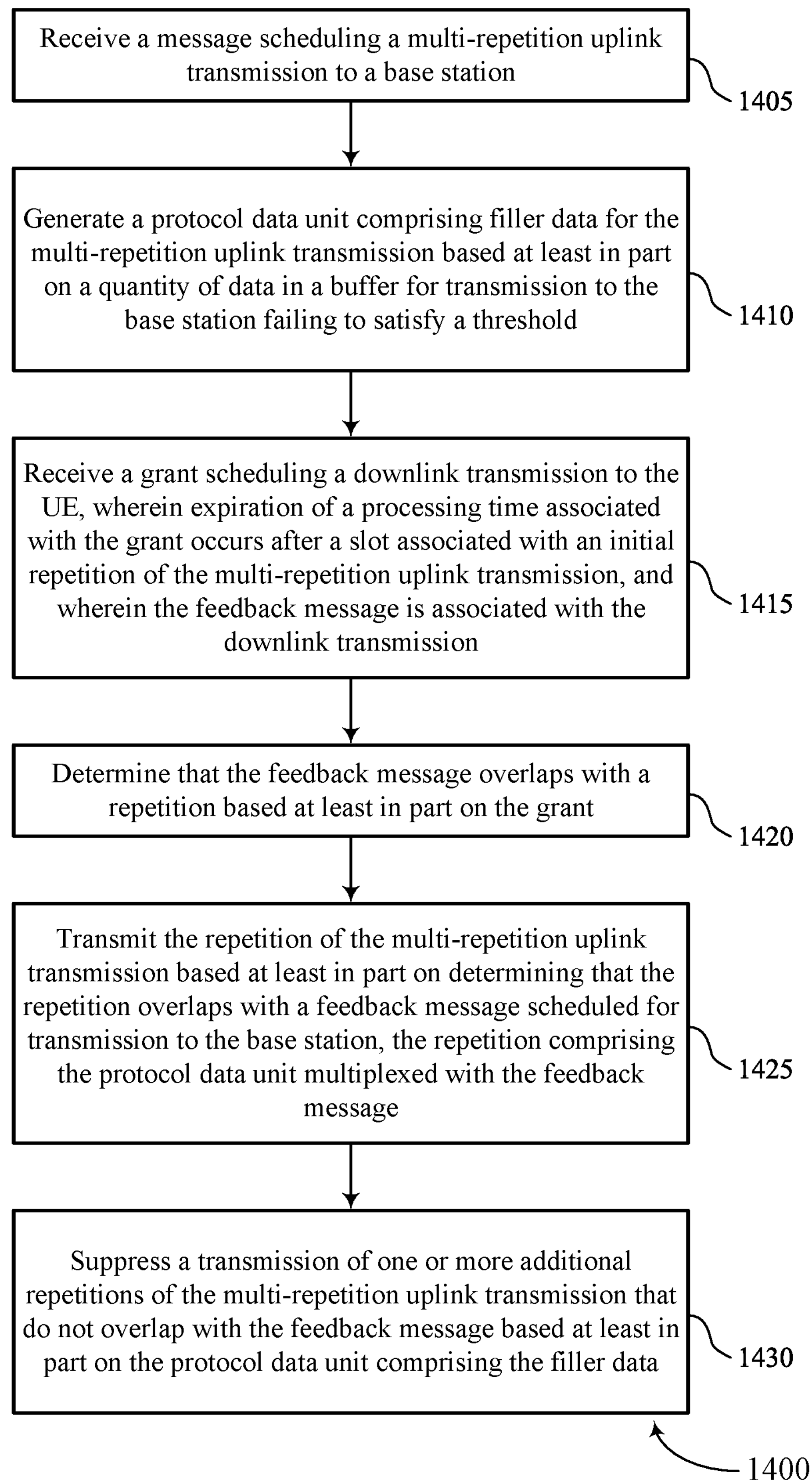

FIG. 14 shows a flowchart illustrating a method 1400 that supports feedback multiplexing for uplink transmission with repetition skipping in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving a message scheduling a multi-repetition uplink transmission to a base station. The operations of 1405 may be performed in accordance with examples as disclosed herein. In some examples, aspects of the operations of 1405 may be performed by an PUSCH grant manager 625 as described with reference to FIG. 6.

At 1410, the method may include generating a PDU including filler data for the multi-repetition uplink transmission based on a quantity of data in a buffer for transmission to the base station failing to satisfy a threshold. The operations of 1410 may be performed in accordance with examples as disclosed herein. In some examples, aspects of the operations of 1410 may be performed by a MAC PDU manager 630 as described with reference to FIG. 6.

At 1415, the method may include receiving a grant scheduling a downlink transmission to the UE, where expiration of a processing time associated with the grant occurs after a slot associated with an initial repetition of the multi-repetition uplink transmission, and where the feedback message is associated with the downlink transmission. The operations of 1415 may be performed in accordance with examples as disclosed herein. In some examples, aspects of the operations of 1415 may be performed by an PDSCH grant manager 645 as described with reference to FIG. 6.

At 1420, the method may include determining that the feedback message overlaps with the repetition based on the grant. The operations of 1420 may be performed in accordance with examples as disclosed herein. In some examples, aspects of the operations of 1420 may be performed by an PDSCH grant manager 645 as described with reference to FIG. 6.

At 1425, the method may include transmitting a repetition of the multi-repetition uplink transmission based on determining that the repetition overlaps with a feedback message scheduled for transmission to the base station, the repetition including the PDU multiplexed with the feedback message. The operations of 1425 may be performed in accordance with examples as disclosed herein. In some examples, aspects of the operations of 1425 may be performed by an PUSCH repetition manager 635 as described with reference to FIG. 6.

At 1430, the method may include suppressing a transmission of one or more additional repetitions of the multi-repetition uplink transmission that do not overlap with the feedback message based on the PDU including the filler data. The operations of 1430 may be performed in accordance with examples as disclosed herein. In some examples, aspects of the operations of 1430 may be performed by an PUSCH repetition manager 635 as described with reference to FIG. 6.

Figure 15:
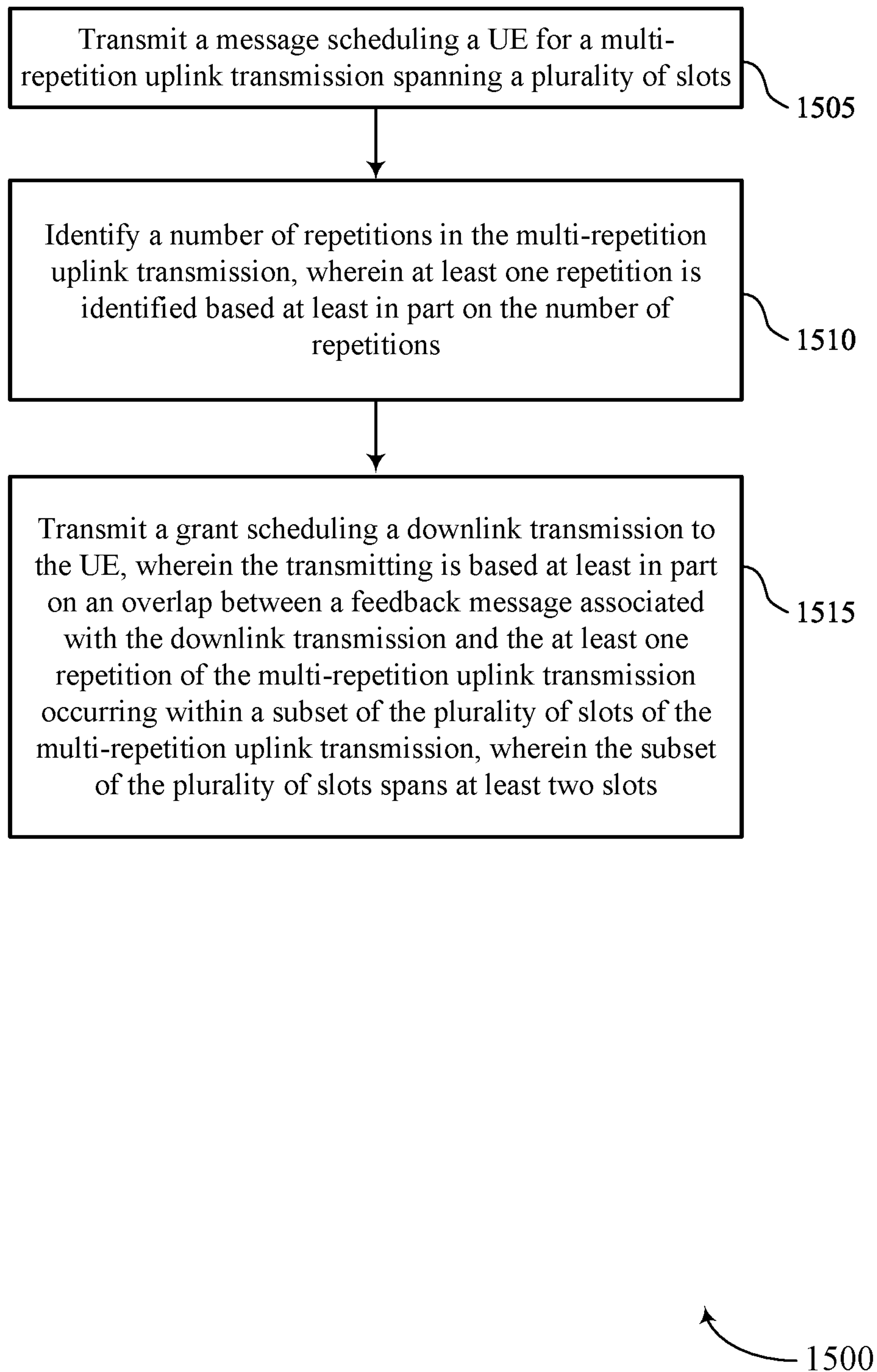

FIG. 15 shows a flowchart illustrating a method 1500 that supports feedback multiplexing for uplink transmission with repetition skipping in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting a message scheduling a UE for a multi-repetition uplink transmission spanning a set of multiple slots. The operations of 1505 may be performed in accordance with examples as disclosed herein. In some examples, aspects of the operations of 1505 may be performed by an PUSCH grant manager 1025 as described with reference to FIG. 10.

At 1510, the method may include identifying a number of repetitions in the multi-repetition uplink transmission, where at least one repetition is identified based on the number of repetitions. The operations of 1510 may be performed in accordance with examples as disclosed herein. In some examples, aspects of the operations of 1510 may be performed by a repetition count manager 1040 as described with reference to FIG. 10.

At 1515, the method may include transmitting a grant scheduling a downlink transmission to the UE, wherein the transmitting is based on an overlap between a feedback message associated with the downlink transmission and the at least one repetition of the multi-repetition uplink transmission occurring within a subset of the set of multiple slots of the multi-repetition uplink transmission, where the subset of the set of multiple slots spans at least two slots. The operations of 1515 may be performed in accordance with examples as disclosed herein. In some examples, aspects of the operations of 1515 may be performed by an PDSCH grant manager 1035 as described with reference to FIG. 10.

Figure 16:
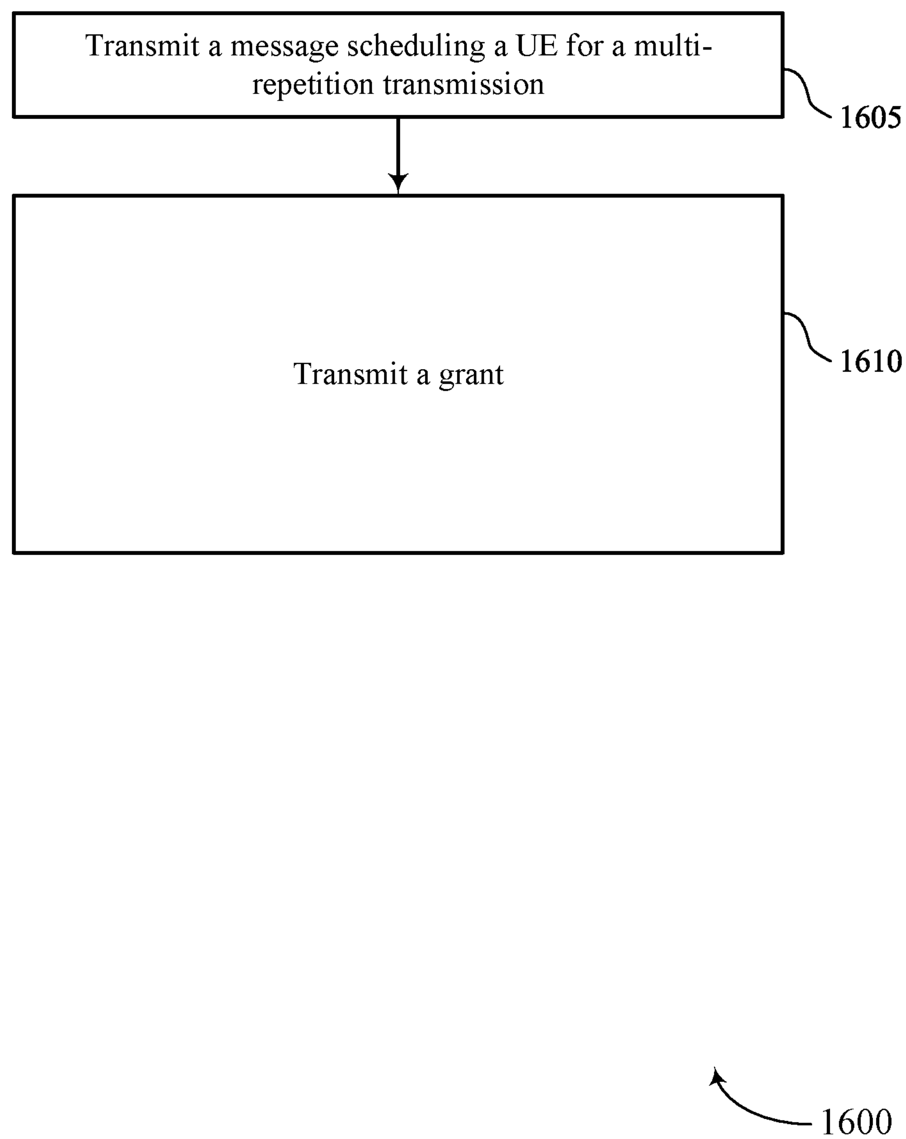

FIG. 16 shows a flowchart illustrating a method 1600 that supports feedback multiplexing for uplink transmission with repetition skipping in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting a message scheduling a UE for a multi-repetition transmission. In some aspects, the scheduling may include spatial resource(s) (e.g., identifying beam/directional resource(s)), frequency resource(s) (e.g., identifying tone(s)/subchannel(s), bandwidth(s), BWP(s), etc., resources), and/or time resource(s) (e.g., spanning any combination of symbol(s), mini-slot(s), set(s) of mini-slot(s), slot(s), set(s) of multiple slots, and the like. The operations of 1605 may be performed in accordance with examples as disclosed herein. In some examples, aspects of the operations of 1605 may be performed by an PUSCH grant manager 1025 as described with reference to FIG. 10.

At 1610, the method may include transmitting a grant. In some aspects, the grant may schedule a downlink transmission to the UE. For example, the grant may be a DCI grant identifying resources and/or configuration information for the downlink transmission to the UE. In some examples, there may be an overlap between a feedback message for the downlink transmission (e.g., HARQ-ACK feedback) and repetition(s). For example, the base station may transmit the grant to the UE based on an overlap between the feedback message associated with the downlink transmission and at least one repetition of a multi-repetition uplink transmission from the UE. In some aspects, the repetition(s) may occur within a subset of the time resource (e.g., within a set of multiple slots of the multi-repetition uplink transmission). In some examples, the subset of the set of multiple slots may span at least two symbols, mini-slots, slots, etc. The operations of 1610 may be performed in accordance with examples as disclosed herein. In some examples, aspects of the operations of 1610 may be performed by an PDSCH grant manager 1035 as described with reference to FIG. 10.

The following provides an overview of aspects of the present disclosure:

Aspect 1: A method for wireless communications at a UE, comprising: receiving a message scheduling a multi-repetition uplink transmission to a base station (e.g., network device); generating a PDU comprising filler data for the multi-repetition uplink transmission based at least in part on a quantity of data in a buffer for transmission to the base station failing to satisfy a threshold; transmitting a first repetition of the multi-repetition uplink transmission based at least in part on determining that the first repetition overlaps with a feedback message scheduled for transmission to the base station, the first repetition comprising the PDU multiplexed with the feedback message; and suppressing a transmission of one or more additional repetitions of the multi-repetition uplink transmission that do not overlap with the feedback message based at least in part on the PDU comprising the filler data.

Aspect 2: The method of aspect 1, further comprising: providing, by a medium access control layer and to a physical layer of the UE, an indication that the PDU comprises the filler data, wherein the one or more additional repetitions are suppressed by the physical layer based at least in part on the indication.

Aspect 3: The method of any of aspects 1 through 2, further comprising: receiving a grant scheduling a downlink transmission to the UE, wherein expiration of a processing time associated with the grant occurs after a slot associated with an initial repetition of the multi-repetition uplink transmission, and wherein the feedback message is associated with the downlink transmission; and determining that the feedback message overlaps with the first repetition based at least in part on the grant.

Aspect 4: The method of any of aspects 1 through 3, further comprising: receiving an indication that uplink transmission skipping is supported for the multi-repetition uplink transmission, wherein the suppressing is based at least in part on the indication.

Aspect 5: A method for wireless communication at a base station, comprising: transmitting a message scheduling a UE for a multi-repetition uplink transmission spanning a plurality of slots; and transmitting a grant scheduling a downlink transmission to the UE, wherein the transmitting is based at least in part on an overlap between a feedback message associated with the downlink transmission and at least one repetition of the multi-repetition uplink transmission occurring within a subset of the plurality of slots of the multi-repetition uplink transmission, wherein the subset of the plurality of slots spans at least two slots.

Aspect 6: The method of aspect 5, further comprising: identifying a number of repetitions in the multi-repetition uplink transmission, wherein the at least one repetition is identified based at least in part on the number of repetitions.

Aspect 7: The method of any of aspects 5 through 6, wherein the at least two slots comprise a first N number of slots occurring within the plurality of slots, N comprises a positive integer.

Aspect 8: The method of any of aspects 5 through 7, further comprising: identifying a processing time associated with the UE processing the grant, wherein a transmission time for the grant is based at least in part on the processing time.

Aspect 9: The method of any of aspects 5 through 8, further comprising: transmitting an indication that repetition skipping is supported for the multi-repetition uplink transmission.

Aspect 10: An apparatus for wireless communications at a UE, comprising a processor; memory coupled with the processor; and instructions stored in the memory and executable by the processor to cause the apparatus to perform a method of any of aspects 1 through 4.

Aspect 11: An apparatus for wireless communications at a UE, comprising at least one means for performing a method of any of aspects 1 through 4.

Aspect 12: A non-transitory computer-readable medium storing code for wireless communications at a UE, the code comprising instructions executable by a processor to perform a method of any of aspects 1 through 4.

Aspect 13: An apparatus for wireless communication at a base station, comprising a processor; memory coupled with the processor; and instructions stored in the memory and executable by the processor to cause the apparatus to perform a method of any of aspects 5 through 9.

Aspect 14: An apparatus for wireless communication at a base station, comprising at least one means for performing a method of any of aspects 5 through 9.

Aspect 15: A non-transitory computer-readable medium storing code for wireless communication at a base station, the code comprising instructions executable by a processor to perform a method of any of aspects 5 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more transceivers;

one or more processors;

one or more memories coupled with the one or more processors; and instructions stored in the one or more memories and executable by the one or more processors to cause the UE to:

receive, via the one or more transceivers, a message scheduling a multi-repetition uplink transmission to a network device;

generate a protocol data unit comprising filler data for the multi-repetition uplink transmission based at least in part on a quantity of data in a buffer for transmission to the network device failing to satisfy a threshold;

transmit, via the one or more transceivers, a repetition of the multi-repetition uplink transmission based at least in part on the repetition overlapping with a feedback message scheduled for transmission to the network device, the repetition comprising the protocol data unit multiplexed with the feedback message; and skip a transmission of one or more additional repetitions of the multi-repetition uplink transmission that do not overlap with the feedback message based at least in part on the protocol data unit comprising the filler data.

2. The UE of claim 1, wherein the instructions are further executable by the one or more processors to cause the UE to:

provide, via a medium access control layer and to a physical layer of the UE, an indication that the protocol data unit comprises the filler data, wherein the one or more additional repetitions are suppressed by the physical layer based at least in part on the indication.

3. The UE of claim 1, wherein the instructions are further executable by the one or more processors to cause the UE to:

receive, via the one or more transceivers, a grant scheduling a downlink transmission to the UE, wherein expiration of a processing time associated with the grant occurs after a slot associated with an initial repetition of the multi-repetition uplink transmission, and wherein the feedback message is associated with the downlink transmission, the overlap between the feedback message and the repetition being based at least in part on the grant.

4. The UE of claim 1, wherein the instructions are further executable by the one or more processors to cause the UE to:

receive, via the one or more transceivers, an indication that uplink transmission skipping is supported for the multi-repetition uplink transmission, wherein the skipping is based at least in part on the indication.

5. A method for wireless communications by a user equipment (UE), comprising:

receiving a message scheduling a multi-repetition uplink transmission to a network device;

generating a protocol data unit comprising filler data for the multi-repetition uplink transmission based at least in part on a quantity of data in a buffer for transmission to the network device failing to satisfy a threshold;

transmitting a repetition of the multi-repetition uplink transmission based at least in part on the repetition overlapping with a feedback message scheduled for transmission to the network device, the repetition comprising the protocol data unit multiplexed with the feedback message; and skipping a transmission of one or more additional repetitions of the multi-repetition uplink transmission that do not overlap with the feedback message based at least in part on the protocol data unit comprising the filler data.

6. The method of claim 5, further comprising:

providing, via a medium access control layer and to a physical layer of the UE, an indication that the protocol data unit comprises the filler data, wherein the one or more additional repetitions are suppressed by the physical layer based at least in part on the indication.

7. The method of claim 5, further comprising:

receiving a grant scheduling a downlink transmission to the UE, wherein expiration of a processing time associated with the grant occurs after a slot associated with an initial repetition of the multi-repetition uplink transmission, and wherein the feedback message is associated with the downlink transmission, the overlap between the feedback message and the repetition being based at least in part on the grant.

8. The method of claim 5, further comprising:

receiving an indication that uplink transmission skipping is supported for the multi-repetition uplink transmission, wherein the skipping is based at least in part on the indication.

9. A non-transitory computer-readable medium storing code for wireless communication by a user equipment (UE), the code comprising instructions executable by one or more processors to cause the UE to:

receive a message scheduling a multi-repetition uplink transmission to a network device;

generate a protocol data unit comprising filler data for the multi-repetition uplink transmission based at least in part on a quantity of data in a buffer for transmission to the network device failing to satisfy a threshold;

transmit a repetition of the multi-repetition uplink transmission based at least in part on the repetition overlapping with a feedback message scheduled for transmission to the network device, the repetition comprising the protocol data unit multiplexed with the feedback message; and skip a transmission of one or more additional repetitions of the multi-repetition uplink transmission that do not overlap with the feedback message based at least in part on the protocol data unit comprising the filler data.

10. The non-transitory computer-readable medium of claim 9, wherein the instructions are further executable by the one or more processors to cause the UE to:

provide, via a medium access control layer and to a physical layer of the UE, an indication that the protocol data unit comprises the filler data, wherein the one or more additional repetitions are suppressed by the physical layer based at least in part on the indication.

11. The non-transitory computer-readable medium of claim 9, wherein the instructions are further executable by the one or more processors to cause the UE to:

receive a grant scheduling a downlink transmission to the UE, wherein expiration of a processing time associated with the grant occurs after a slot associated with an initial repetition of the multi-repetition uplink transmission, and wherein the feedback message is associated with the downlink transmission, the overlap between the feedback message and the repetition being based at least in part on the grant.

12. The non-transitory computer-readable medium of claim 9, wherein the instructions are further executable by the one or more processors to cause the UE to:

receive an indication that uplink transmission skipping is supported for the multi-repetition uplink transmission, wherein the skipping is based at least in part on the indication.

13. A user equipment (UE), comprising:

means for receiving a message scheduling a multi-repetition uplink transmission to a network device;

means for generating a protocol data unit comprising filler data for the multi-repetition uplink transmission based at least in part on a quantity of data in a buffer for transmission to the network device failing to satisfy a threshold;

means for transmitting a repetition of the multi-repetition uplink transmission based at least in part on the repetition overlapping with a feedback message scheduled for transmission to the network device, the repetition comprising the protocol data unit multiplexed with the feedback message; and means for skipping a transmission of one or more additional repetitions of the multi-repetition uplink transmission that do not overlap with the feedback message based at least in part on the protocol data unit comprising the filler data.

14. The UE of claim 13, further comprising:

means for providing, via a medium access control layer and to a physical layer of the UE, an indication that the protocol data unit comprises the filler data, wherein the one or more additional repetitions are suppressed by the physical layer based at least in part on the indication.

15. The UE of claim 13, further comprising:

means for receiving a grant scheduling a downlink transmission to the UE, wherein expiration of a processing time associated with the grant occurs after a slot associated with an initial repetition of the multi-repetition uplink transmission, and wherein the feedback message is associated with the downlink transmission, the overlap between the feedback message and the repetition being based at least in part on the grant.

16. The UE of claim 13, further comprising:

means for receiving an indication that uplink transmission skipping is supported for the multi-repetition uplink transmission, wherein the skipping is based at least in part on the indication.

* * * * *